(12) United States Patent
Nemecek et al.

(10) Patent No.: US 7,613,623 B2
(45) Date of Patent: Nov. 3, 2009

(54) ENTERPRISE MANAGEMENT USING AN ENTERPRISE PROGRAM OFFICE (EPO)

(75) Inventors: Carole M. Nemecek, Irving, TX (US); Tracy D. Smith, Plano, TX (US); David A. Theriault, Southfield, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1213 days.

(21) Appl. No.: 10/346,928

(22) Filed: Jan. 17, 2003

(65) Prior Publication Data
US 2004/0054565 A1 Mar. 18, 2004

Related U.S. Application Data

(60) Provisional application No. 60/411,807, filed on Sep. 17, 2002.

(51) Int. Cl.
*G06F 17/60* (2006.01)
(52) U.S. Cl. .................. 705/7; 705/8; 705/9; 709/223; 707/10
(58) Field of Classification Search .................. None
See application file for complete search history.

(56) References Cited

U.S. PATENT DOCUMENTS

| | | | | |
|---|---|---|---|---|
| 5,826,252 | A * | 10/1998 | Wolters et al. ................. | 707/1 |
| 6,308,164 | B1 * | 10/2001 | Nummelin et al. ............. | 705/9 |
| RE38,633 | E * | 10/2004 | Srinivasan ..................... | 707/10 |
| 7,051,036 | B2 * | 5/2006 | Rosnow et al. ............. | 707/102 |
| 7,246,144 | B2 * | 7/2007 | Walsh et al. ................. | 709/200 |
| 7,286,999 | B2 * | 10/2007 | Majd et al. ...................... | 705/8 |
| 2002/0194101 | A1 * | 12/2002 | Moore et al. .................. | 705/36 |
| 2002/0198926 | A1 * | 12/2002 | Panter et al. ................. | 709/106 |
| 2003/0014442 | A1 * | 1/2003 | Shiigi et al. ................. | 707/513 |
| 2003/0061330 | A1 * | 3/2003 | Frisco et al. ................. | 709/223 |
| 2004/0073886 | A1 * | 4/2004 | Irani ........................... | 717/101 |
| 2006/0053043 | A1 * | 3/2006 | Clarke .......................... | 705/8 |

OTHER PUBLICATIONS

Ajenstat, J.; Benchimol, J., "NSS in project management enterprise wide technologies: the case of PMOffice™," System Sciences, 1999. HICSS-32. Proceedings of the 32nd Annual Hawaii International Conference on , vol.Track1 , No., pp. 9 pp.-,1999.*

(Continued)

*Primary Examiner*—Ramesh B Patel
*Assistant Examiner*—Dave Robertson

(57) ABSTRACT

In one embodiment, a system for establishing an enterprise-specific enterprise program office (EPO) and an associated enterprise-specific EPO web site includes a server system operable to communicate with a plurality of client systems each associated with a corresponding enterprise. A database associated with the server system contains an EPO toolkit accessible to the client systems using the server system. The EPO toolkit includes a customizable EPO web site shell providing a generic EPO web site structure on which an enterprise may base an enterprise-specific EPO web site for an enterprise-specific EPO. The server system is operable to receive from a user a request for the customizable EPO web site shell, retrieve such shell from the database, and provide such shell to the user for customization, if desired, to create an enterprise-specific EPO web site shell with features particular to the corresponding enterprise.

32 Claims, 14 Drawing Sheets

OTHER PUBLICATIONS

Thorn, Michael E. "Bridge Over Troubled Water: Implementation of a Program Management Office" S.A.M. Advanced Management Journal; Autumn 2003; 68, 4; ABI/INFORM Global, p. 48.*

Kwak, Y.H. and Dai, C (2000) Assessing the Value of Project Management Offices (PMO), Project Management Institute Research Conference 2000, PMI, Paris, France, Jun. 21-24, pp. 333-338.*

Bates, W.S., Improving project management: better project management begings with a project management office. Indust. Eng. 30 10 (1998), p. 42.*

Dinsmore, Paul C. Winning in Business with Enterprise Project Management. AMACOM: 1999; pp. 49-52.*

M. Light, T. Berg, "The Project Office: Teams, Processes and Tools," Gartner Strategic Analysis Report, Aug. 1, 2000 [downloaded on Nov. 27, 2007 from www.ligo.caltech.edu/~tfrey/MSP_P3/GartnerStrategicAnalysisRep.pdf].*

Crawford, J. Kent. "The Strategic Project Office: Business Case and Implementation Strategy", PM Solutions, 2001 [downloaded on Nov. 28, 2007 from http://home.planet.nl/~avtnl/WP_SPO.pdf].*

Anon. "Systemcorp Announces PMOffice, a New Web-Based Enterprise Project Management Solution" PR Newswire, p. 2413 Dec 7, 1998 [downloaed from Dialog on Nov. 28, 2007 File 16: Accession# 05991583].*

SystemCorp "Enterprise Project & Portfolio Management Software" SystemCorp: 2001 [product information webpage downloaded Nov. 28, 2007 from web.archive.org/.../www.systemcorp.com].*

IDe. "IDweb: Integrated Development Product Chain Management" IDe:2001 [Appendix B of US Pat. Appl. 2004/0078172].*

IBM "IBM and SystemCorp announce strategic alliance to deliver Enterprise Project-Portfolio Management software applications" prdomain Business Register: May 9, 2002 [downloaded Nov. 28, 2007 from www.prdomain.com/.../newsreleases].*

Panter, et al., "Program Management System and Method," USSN 09/891,634, Jun. 25, 2001.

* cited by examiner

ENTERPRISE MANAGEMENT USING AN ENTERPRISE PROGRAM OFFICE (EPO)

RELATED APPLICATION

This application claims the benefit of U.S. Provisional Application Ser. No. 60/411,807 filed Sep. 17, 2002, and is related to U.S. application Ser. No. 09/891,634, entitled "Program Management System and Method," filed Jun. 25, 2001.

TECHNICAL FIELD OF THE INVENTION

This invention relates generally to enterprise management and more particularly to enterprise management using an enterprise program office (EPO).

BACKGROUND OF THE INVENTION

The complexity and volume of work handled by an enterprise is often significant. Much of this work is triggered and reported through existing relationship channels, potentially leaving the leadership of the enterprise somewhat in the dark until an issue surfaces and client emotions possibly run high. Enterprises often encounter a lack of leadership into the activities of the enterprise, leadership visibility into the level of performance of the enterprise, a consistent approach to projects and programs, effective information flow, a process to authorize projects and programs, a mechanism for determining enterprise-wide inter-client prioritization, and a mechanism for ensuring that accounts or clients are informed or consulted on enterprise-wide projects and programs. Within an enterprise, these shortcomings may also be coupled with a lack of communication outside of existing relationships among employees and the existence of multiple projects and programs addressing the same or similar issues in different pockets within the enterprise. This structure may make it difficult to manage the enterprise's complexity, in addition to raising other issues such as leadership dissatisfaction with the enterprise's performance, leadership frustration, employee confusion, and financial exposure.

SUMMARY OF THE INVENTION

According to the present invention, disadvantages and problems associated with previous enterprise management techniques may be reduced or eliminated.

In one embodiment of the present invention, a management structure for managing an enterprise includes a governance structure responsible for making leadership decisions for the enterprise and an enterprise program office (EPO) responsible for reviewing projects and programs of the enterprise. Each project includes a temporary endeavor of a portion of the enterprise, having a defined start and end, and being undertaken to create a product or service within specified parameters of cost, time, and quality, and each program includes a number of projects. The EPO implements EPO processes to coordinate and analyze projects and programs to compile reporting information regarding each project and program, provides the governance structure with visibility into projects and programs through such information, and provides recommendations to the governance structure. The governance structure is responsible for reviewing the compiled reporting information, administering decisions based on such information, and communicating the decisions to the EPO to instruct the EPO as to how to proceed.

In another embodiment, a system for establishing an enterprise-specific enterprise program office (EPO) and an associated enterprise-specific EPO web site includes a server system operable to communicate with a plurality of client systems each associated with a corresponding enterprise. A database associated with the server system contains an EPO toolkit accessible to the client systems using the server system. The EPO toolkit includes a customizable EPO web site shell providing a generic EPO web site structure on which an enterprise may base an enterprise-specific EPO web site for an enterprise-specific EPO. The server system is operable to receive from a user a request for the customizable EPO web site shell, retrieve such shell from the database, and provide such shell to the user for customization, if desired, to create an enterprise-specific EPO web site shell with features particular to the corresponding enterprise.

Particular embodiments of the present invention may provide one or more technical advantages. For example, in certain embodiments, an enterprise program office (EPO) may provide oversight, verification, and control of information technology (IT) projects and programs, product design projects and programs, construction projects and programs, manufacturing projects and programs, or any other suitable projects and programs. The EPO may provide this oversight, verification, and control of projects and programs possibly by leveraging best practices, exercising knowledge management, and applying innovative thought leadership. The EPO may provide integrated views of business information with insight to enable effective business decision-making and aid in the alignment of client and account business strategies. The EPO may enable the enterprise to increase revenues, reduce costs, achieve performance objectives, and manage growth through more effective use of organizational resources. These processes may complement other project and program management methodologies to complete the management spectrum from project to enterprise.

A toolkit enabling the EPO may provide the foundation for maintaining enterprise-wide processes, which may enable insight into the "white space" between projects and programs by identifying interdependencies and aligning approved projects and programs with the enterprise's business strategies. The EPO toolkit may improve project and program management performance, which may for example: increase financial performance (i.e. increase on-time and in-budget project performance), provide accountability for projects and programs that will be clearly defined, provide visibility of projects and programs across the enterprise, and provide visibility to executives of the new business pipeline and resource capacity requirements. The EPO toolkit may provide the EPO as the common source for project and program status and business value assessment. This may involve, for example, consolidating business metrics pertaining to the client to enable improved visibility and analysis of trends and the opportunity to trigger projects and programs proactively, to proactively inform the executive leadership of projects and programs at risk of reporting a financial loss to the enterprise, and to maintain or enhance client satisfaction.

Utilizing the EPO toolkit to establish an EPO and a leadership, or governance, structure may facilitate a common voice to the client, whereby the EPO may serve as a touchpoint to the client that provides visibility into what is going well and what is not going well within the enterprise. The EPO toolkit may provide the structure and support the governance structure needs to successfully review projects and programs to determine which projects and programs should be stopped, started, or redirected. The governance structure may provide an enterprise with the following benefits, as examples: providing an integrated enterprise perspective; streamlining decision-making; avoiding duplication of effort;

prioritizing investment decisions; ensuring business and technology alignment; improving project and program management service delivery; allowing focus on external marketplace and clients; and ensuring planned benefits are achieved.

Systems and methods incorporating one or more of these or other technical advantages may be well suited for modern enterprise management techniques. Certain embodiments of the present invention may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
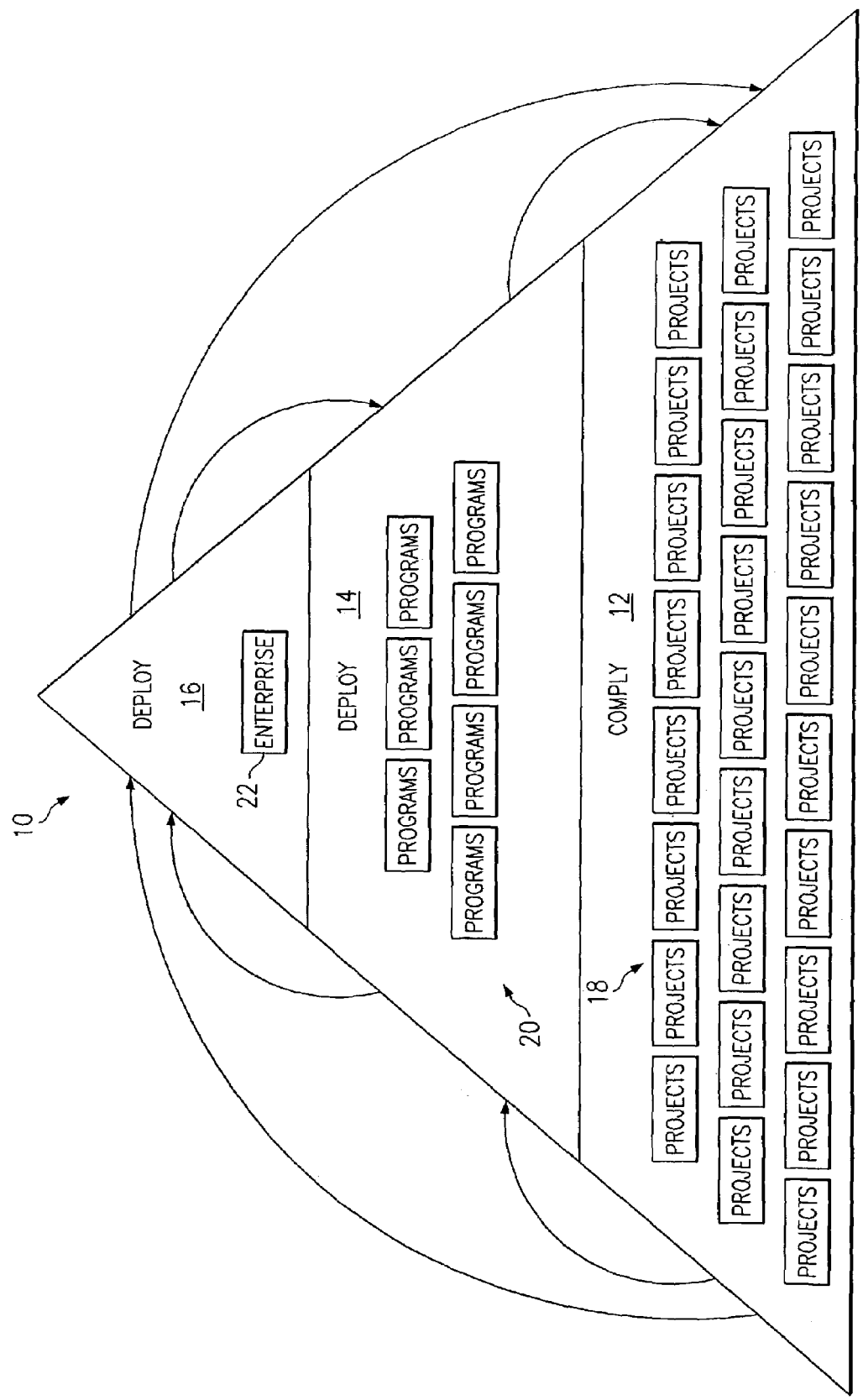
FIG. 1 illustrates an example enterprise and project management framework.

FIG. 1 illustrates an example enterprise and project management framework 10, which may include a project management level 12, a program management level 14, and an enterprise level 16. As just one example, framework 10 may represent a multi-national enterprise comprising multiple subsidiaries and divisions. Although the term "enterprise" is used primarily to refer to a business organization, the present invention contemplates management of any suitable organization and the term "enterprise" is intended to encompass all such organizations.

Project management level 12 may include one or more projects 18. A particular project 18 may include a temporary endeavor with a defined start and end undertaken to create a unique product or service. The particular project 18 may also include a temporary endeavor undertaken to create a unique product or service, the project 18 being focused on achieving a specific objective within specified parameters of cost, time, and quality. Project management layer 12 may include a methodology for planning, monitoring, adjusting, and controlling a series of projects 18, while considering budget, time, resources, and technology constraints. For example, the methodology included in project management layer 12 may include any suitable project management methodology, such as those incorporating industry-accepted project management norms.

Program management level 14 may include one or more programs 20. Programs 20 may include a comprehensive view of interrelated projects 18 focused on the creation of a deliverable or providing a service. Programs 20 may include a group of dependent projects 18 that together may achieve one or more key business objectives to maximize the value of their collective benefits, programs 20 possibly being focused on achieving broad business change objectives and benefits. A particular program 20 may blend the rigors of project management level 12 with a strong focus on customer interface, governance, and interdependencies between projects 18 and other programs 20. A program 20 may be established for pursuit, development, consulting, infrastructure, operational, design, or manufacturing efforts, or for any other suitable reason according to particular needs. Program management level 14 may provide for the administration of a group of interdependent constituent projects 18 that together may achieve one or more business benefits, although, in certain embodiments, not all projects 18 are managed by a program 20. An example program management level 14 is described more fully in U.S. application Ser. No. 09/891,634, entitled "Program Management System and Method," filed Jun. 25, 2001.

Enterprise management level 16 includes at least one enterprise program office (EPO) 22, which may operate one or more enterprise projects 18, one or more programs 20, or a mix of one or more projects 18 and one or more programs 20. EPO 22 may be responsible for coordinating, consolidating, and analyzing projects 18 and programs 20 throughout their life cycles within a particular enterprise, possibly filling the void of project and program management activities required at enterprise level 16. The enterprise may include corporate systems, infrastructures, business processes, and capabilities, as well as product design, construction, manufacturing, or any other suitable projects and programs, possibly throughout global geographies. EPO 22 may provide key leadership members of a particular enterprise, such as within a governance structure of the enterprise, with integrated enterprise views of all projects 18 and programs 20, possibly illustrating their interdependencies. EPO 22 may design, develop, and maintain processes for an enterprise at enterprise management level 16. These EPO processes may be applied to projects 18 and programs 20 that are approved by the governance structure of the enterprise, possibly providing a view from enterprise management level 16 of all approved projects 18 and programs 20. The EPO processes may also help managers of projects 18 and programs 20 by providing a vehicle to elevate required information to, and receive feedback from, the governance structure for awareness, support, guidance, assistance, direction setting, decisions, or other suitable purposes. EPO processes may compliment methodologies at project management level 12 and program management level 14 to help complete the project management spectrum from project management level 12 to enterprise management level 16.

Assessment and visibility of projects 18 and programs 20 and their performance in meeting agreed-upon objectives with key performance indicators may also be a function of EPO 22. These functions may include consolidation, research, analysis, and integration of projects 18 and programs 20 into an enterprise view to be presented to the leadership of the enterprise. Key performance indicators may include decisions from the governance structure, EPO processes and deliverables, and any other suitable indicators. An EPO deliverable may include a component product or output such as test results, hardware, software, or documentation that makes up part of a delivered solution resulting from one or more EPO processes. An EPO deliverable may also include an agreed-upon work product, process output, or other tangible evidence of the satisfactory performance of work. The foundation for EPO deliverables may be project and program management methodologies, which may be included in project management level 12 and program management level 14.

EPO 22 may allow an enterprise to streamline, move to common practices, and globalize business processes, particularly with respect to those projects 18 and programs 20 that span multiple business units and traverse multiple geographic locations. Robust enterprise consolidation of project and program management may become necessary as this coordination becomes more challenging. EPO 22 may provide the structure and support the governance structure needs to successfully evaluate, develop, and implement projects 18 and programs 20. EPO 22 may enable an enterprise to increase revenues, reduce costs, achieve performance objectives, and manage growth through more effective use of organizational resources.

Figure 2:
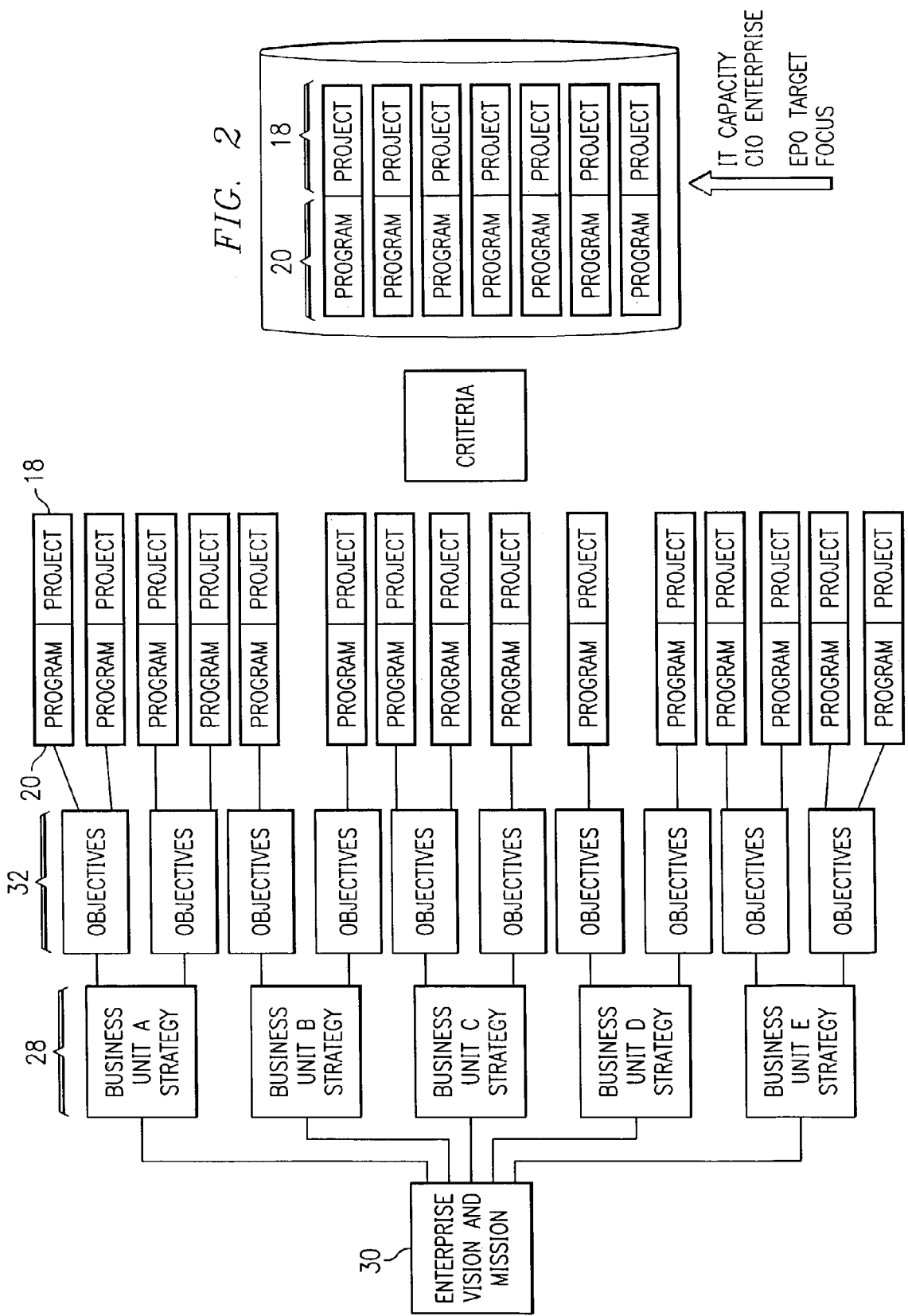
FIG. 2 illustrates an example relationship between the projects and programs of an enterprise and the enterprise vision and mission.

FIG. 2 illustrates an example relationship between projects 18 and programs 20 of an enterprise and an enterprise vision and mission 30. Business and technology strategies 28 of the enterprise may be linked to an overall enterprise vision and mission 30, which may be defined by the governance structure of the enterprise. In order to manage the appropriate value outcomes for EPO deliverables, it may be desirable for a strong link to exist between an enterprise's business and technology strategies 28 and each project 18 or program 20. To build this link, clear roles and accountabilities for each organization (e.g., project or program management team) may be defined between the business and technology plans 28 and the individual projects 18 and programs 20. By connecting projects 18 and programs 20 to the enterprise governance structure, managers of projects 18 and programs 20 may have a direct line-of-sight to the measurable business and technology plan objectives 32. In addition, EPO 22 may define criteria or threshold requirements for registering projects 18 and programs 20 that enable the oversight of key projects 18 and programs 20 within the enterprise.

Figure 3:
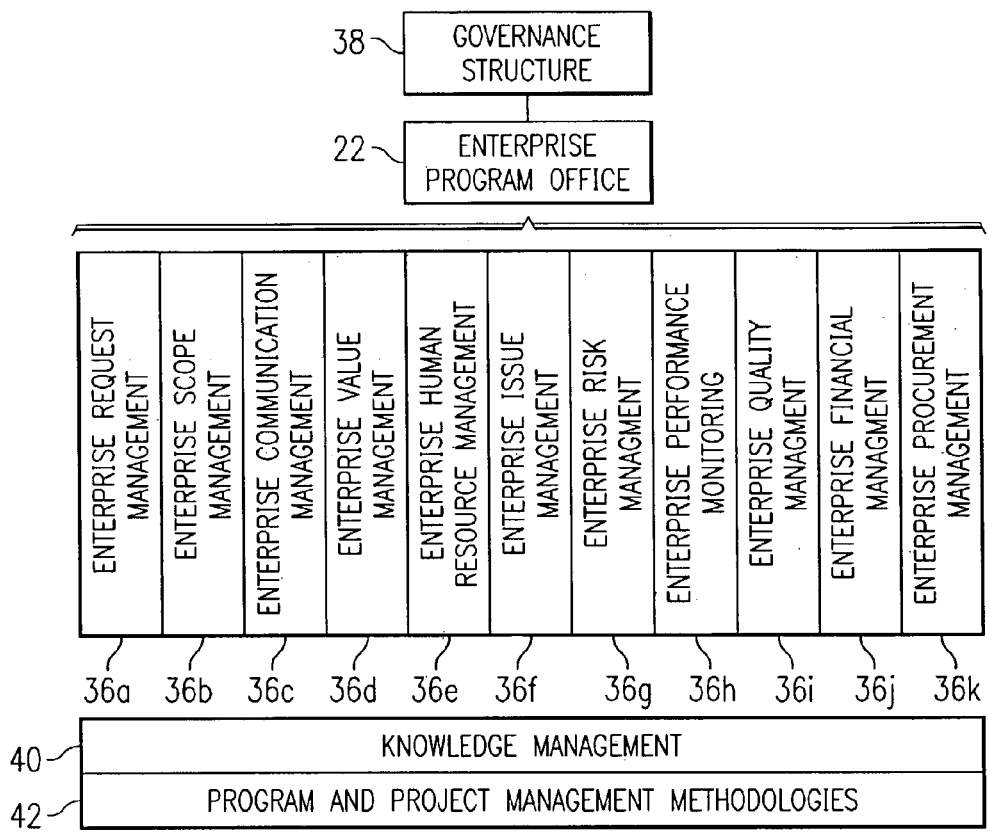
FIG. 3 illustrates an example of an EPO serving as an intermediary between one or more EPO processes and a governance structure.

FIG. 3 illustrates an example of EPO 22 serving as an intermediary between one or more EPO processes 36 and governance structure 38. EPO processes 36 may be associated with various knowledge management methodologies 40 and program and project management methodologies 42, which may be derived using resources associated with project management level 12 and program management level 14.

Figure 4:
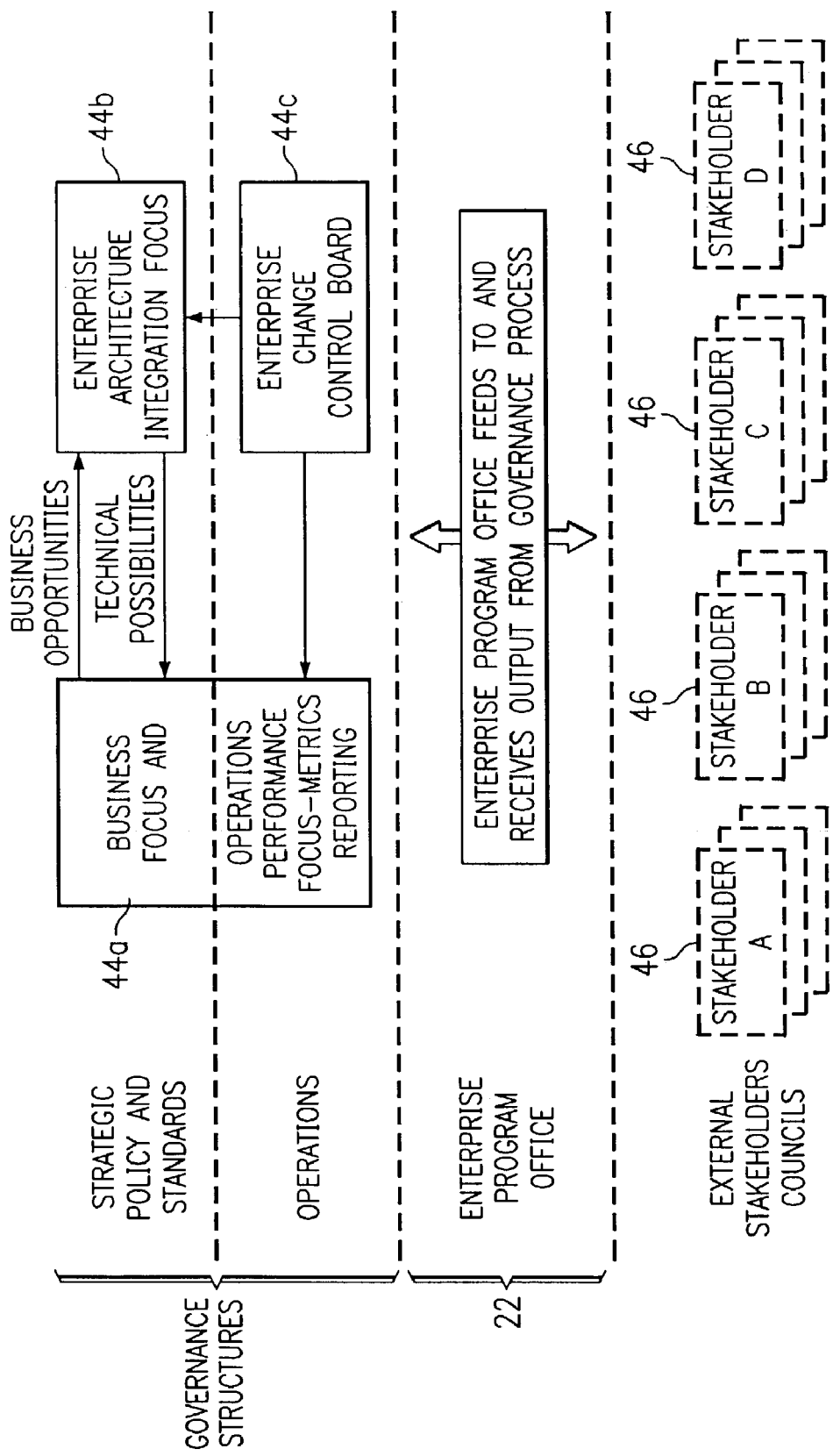
FIG. 4 illustrates an example governance structure and EPO interface between governance and stakeholders.

As illustrated in FIG. 4, in one example, governance structure 38 may include three major governing bodies 44 providing key executive leadership. Governance bodies 44 may jointly form steering committees, governance boards, or other suitable groups that authorize how to proceed with projects 18 and programs 20 (e.g., whether to start, stop, or redirect them). Key functions and responsibilities within governance bodies 44 may include ensuring compliance to business plans and technology strategy and direction, conducting progress reviews of projects 18 and programs 20, and evaluating actual benefits gained to planned benefits as a result of deployment in comparison.

Governance body 44*a* may concentrate on the focus of the enterprise and may be responsible for setting the strategic direction of the enterprise. This may include providing strategies and standards with respect to project and program management practices throughout the enterprise, maintaining visibility as to all approved projects 18 and programs 20 to ensure their continued success, and any other suitable responsibilities according to particular needs. In one embodiment, governance body 44*a* may manage these responsibilities by exception reporting through ongoing performance review meetings. Governance body 44*b* may address technology concerns, which may involve setting technology strategies and standards for the enterprise and ensuring that projects 18 and programs 20 are consistent with these strategies and standards. Governance body 44*b* may review deviations from these strategies and standards for possible inclusion in business and technology strategies 28 or to identify possible alternatives. Governance body 44*c* may address enterprise change control review and approvals. This may involve ensuring that the business environment of the enterprise maintains operational integrity, which may require production readiness reviews for projects 18 and programs 20 that have reached milestones that add functionality and value into the business environment. Governance body 44*c* may provide as a major deliverable a formal decision with respect to particular projects 18 or programs 20 regarding whether to pursue the project 18 or program 20. Although three particular governance bodies 44 are described as examples, the present invention contemplates any suitable governance bodies 44 or combinations of governance bodies 44 according to particular needs.

As illustrated in FIG. 4, EPO 22 may support governance bodies 44 and governance bodies 44 may use outputs from EPO 22 to manage various aspects of the enterprise. EPO 22 may assist project management level 12 and program management level 14 throughout the life cycle of a project 18 or program 20, respectively, with identification, analysis, coordination, performance reporting, or any other suitable functions according to particular needs. EPO 22 may also communicate with one or more stakeholders 46. Stakeholders 46 may include persons, groups, or institutions involved in or affected by a project 18 or program 20. Stakeholders may include those individuals or groups whose support and buy-in are critical to successful implementation of a project 18 or program 20. For example, primary stakeholders 46 may be those ultimately affected, either positively (e.g., beneficiaries) or negatively (e.g., those involuntarily resettled). Secondary stakeholders 46 may include various intermediaries related to project 18 or program 20, such as suppliers and vendors who are supporting various aspects of the implementation of the project 18 or program 20. Key stakeholders 46 may be those who can significantly influence, or are important to the success of a project 18 or program 20.

Returning to FIG. 3, EPO processes 36 may provide a way to bring information related to projects 18 and programs 20 into EPO 22 for coordination, consolidation, analysis, and integration. EPO processes 36 may produce reporting deliverables, which may be inputs for several enterprise functions such as, for example, enterprise operating frameworks, investment strategy planning, enterprise integration planning, and governance.

In one embodiment, for example and without limitation, EPO processes 36 may include enterprise request management process 36a, enterprise scope management process 36b, enterprise communication management process 36c, enterprise value management process 36d, enterprise human resource management process 36e, enterprise issue management process 36f, enterprise risk management process 36g, enterprise performance monitoring process 36h, enterprise quality management process 36i, enterprise financial management process 36j, enterprise procurement management process 36k, and any other suitable EPO process, singly or in any suitable combination. The present invention contemplates any suitable number and types of EPO processes 36 according to particular needs. Furthermore, a particular EPO process 36 may contain one or more EPO sub-processes suitable for carrying out the particular EPO process 36. Certain of these example EPO processes 36 are described in detail below.

Enterprise Request Management Process

In one embodiment, enterprise request management process 36a may be divided into two sub-processes, initiate request sub-process and estimate summary sub-process.

The enterprise request management-initiate request sub-process may be used to initiate a request for a new project 18 or program 20 and may provide a high-level overview of what the proposed project 18 or program 20 is intended to deliver and how that may be achieved. This structure may allow for prioritization at appropriate levels of the enterprise. The initiate request sub-process may be used to provide rough estimates to help determine funding requirements and to identify benefits/value, time lines, and major risks of projects 18 and programs 20. The initiate request sub-process may help prevent project 18 and program 20 delays before deployment and help a requestor of a project 18 or program 20 to identify critical information.

The initiate request sub-process may help assess the alignment of the proposed project 18 or program 20 to corporate strategies, as well as possibly assessing integration with existing systems and other projects 18 and programs 20. Forms associated with the initiate request sub-process may be used to provide a consistent way to initiate a request for a new project 18 or program 20 in order to assist in ease of decision-making. For example, these initiate request forms may include inquiries into the cost of a particular project 18 or program 20. In certain embodiments, funding for all new projects 18 and programs 20 within the scope of EPO 22 is determined through the initiate request sub-process.

EPO 22 may facilitate the approval process for all requests for projects 18 and programs 20. Once a new project 18 or program 20 request is received, EPO 22 may perform an initial assessment of the request and record the information on a request log. EPO 22 may provide recommendations to governance structure 38 and may also schedule and facilitate one or more reviews of the request with the appropriate governance bodies 44. The requestor may receive an e-mail or other communication from EPO 22 indicating the date and time for the scheduled governance structure reviews. The requestor may be required to provide information at these reviews. In certain embodiments, documentation for projects 18 and programs 20 may be made available to EPO 22 when requested. Subsequent to the reviews, EPO 22 may communicate a decision from governance structure 38 indicating that the request was approved (continue to the next EPO process 36), stopped (initiate a close-down EPO process 36 that may be monitored by EPO 22), or redirected (which may include an instruction to make changes and re-submit the request or to put the request on hold).

If the initiate request sub-process results in approval to proceed to the next step, the requestor may be required to continue to the enterprise request management-estimate summary sub-process before final approval for a project 18 or program 20 may be given.

Figure 5:
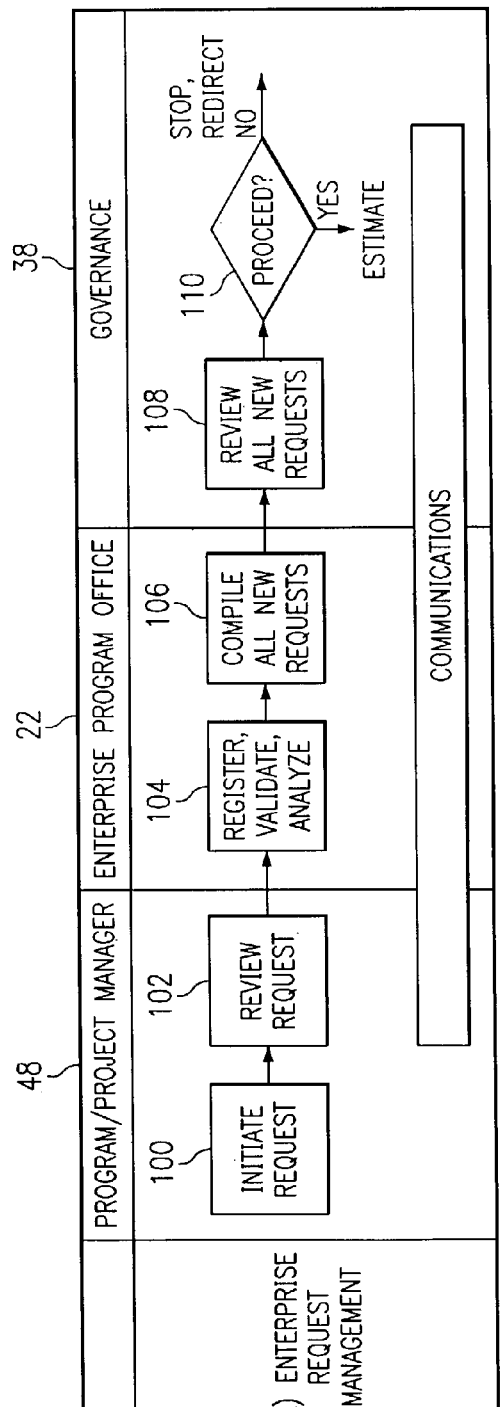
FIG. 5 illustrates an example enterprise request management-initiate request sub-process.

FIG. 5 illustrates an example enterprise request management-initiate request sub-process 47. At step 100, a project or program manager 48 may request a new project 18 or program 20, respectively. This may involve identifying an executive sponsor of the project 18 or program 20 and contacting EPO 22 for assistance in determining the executive sponsor. It may also be beneficial to select an executive sponsor within governance structure 38 to assist with approvals for project 18 or program 20. Requesting a new project 18 or program 20 may also involve performing self-assessments to determine how the request maps to, for example, organizational business strategies, technology strategies, enterprise processes, and budgetary priorities. EPO 22 may assist with such a self-assessment. Furthermore, the category of the project 18 or program 20 may be determined at step 100.

Figure 6:
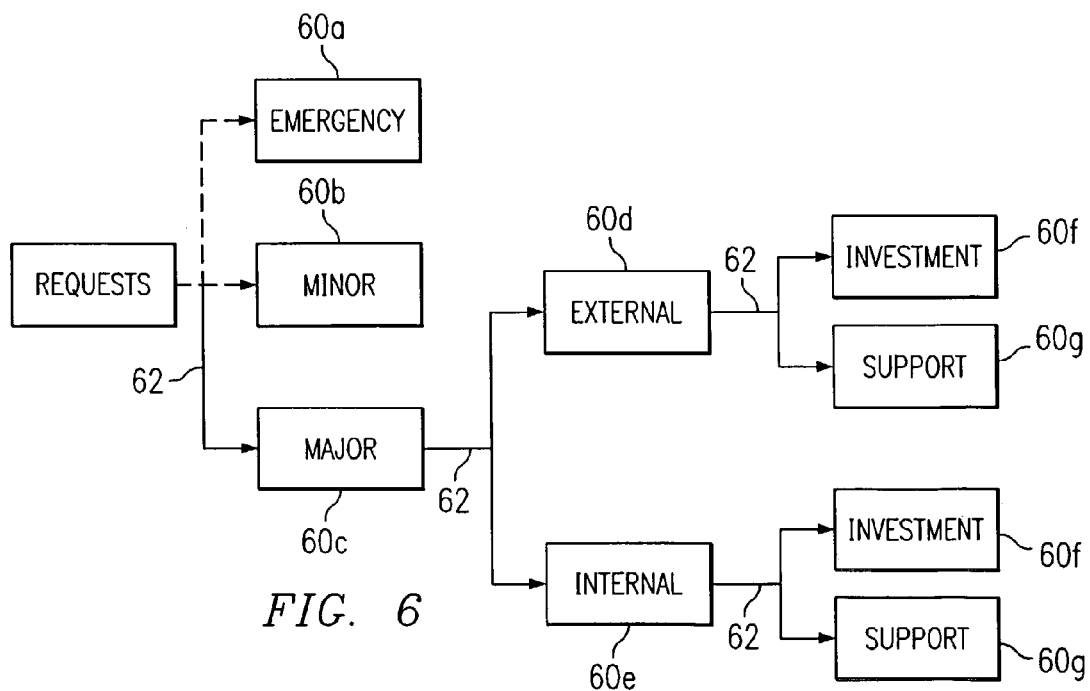
FIG. 6 illustrates example categories for projects and programs.

FIG. 6 illustrates example categories 60 for projects 18 and programs 20. In one embodiment, projects 18 and programs 20 may be first categorized as emergency 60a, minor 60b, or major 60c. Requests illustrated with a solid line 62 may be within the normal scope of EPO 22 (and thus initiate request sub-process 47), although exceptions may occur. For example, in the illustrated embodiment, only projects 18 and programs 20 categorized as major 60c fall within the scope of EPO 22. Certain criteria, which may be established by EPO 22 and governance structure 38, may be used to determine if a project 18 or program 20 is within the scope of EPO 22. In one embodiment, criteria for making this determination may include, for example: whether a project 18 takes more than a predetermined number of hours; whether a program spans multiple projects 18, processes or functional areas, or business units; whether a project 18 or program 20 is handled outside of normal maintenance schedules; and any other suitable criteria. It may be preferable for governance structure 38 to define and approve these criteria. Initially a project 18 or program 20 may not meet any of these criteria. In that case, when there is a change in the scope of a project 18 or program 20, the project or program manager 48 of the project 18 or program 20 may need to re-evaluate the project 18 or program 20 to determine if it meets the criteria. These scope changes may be cumulative, so project or program manager 48 may need to consider all the scope changes for the project 18 or program 20 when re-evaluating to determine if it meets the criteria.

If the project 18 or program 20 meets the criteria, then its project or program manager 48 may need to follow initiate request sub-process 47. If the request for a project 18 or program 20 satisfies at least one of these criteria, then its project or program manager 48 may complete an initiate request form, which may accommodate all requests that fall within the scope of EPO 22. The project 18 or program 20 may also be categorized as external 60d or internal 60e to the enterprise associated with EPO 22, and relating to investment 60f, support 60g, or any other suitable category. If funding is required to complete an estimate summary, then the funding requirements may also be specified in a costs section of the initiate request form.

Returning to FIG. 5, at step 102, a request for a project 18 or program 20 may be reviewed. The project or program manager 48 of the project 18 or program 20 may initially review the request with his or her external stakeholders 46. Project or program manager 48 may also be required to obtain documented approvals from external stakeholders 46, if applicable, and from the executive sponsor. At step 104, EPO 22 may register, validate, and analyze the request. EPO 22 may verify an approval from external stakeholders 46 and the executive sponsor, which may have occurred at step 102. EPO 22 may assign a request identifier number to the request, update a request log, and acknowledge receipt of the request. Other activities of EPO 22 associated with step 104 may include, for example: ensuring the request is not a duplicate of another project 18 or program 20, ensuring the initiate request form is complete, clarifying information on the initiate request form, reviewing the project 18 or program 20 to determine if it should be tracked by EPO 22 or by another organization, analyzing the request to ensure that it fits within the various corporate strategies, determining if other external stakeholders 46 or executive sponsors should review the request before it is submitted to governance structure 38 (if other reviews are necessary, the request may be re-submitted after it is approved), and determining which governance bodies 40 need to review the request and when. EPO 22 may document the results of this analysis and its recommendations and may also notify project or program manager 48 of the recommendations of EPO 22 and which governance structure reviews will take place.

At step 106, new requests may be compiled. EPO 22 may submit the request assessment, recommendation, and any supporting documentation generated at step 104 to an appropriate governance structure facilitator, who may add the information to an agenda and distribute it to governance structure members. At step 108, new requests may be reviewed. In one embodiment, governance structure reviews may be prioritized based on outstanding requests across the enterprise. At step 110, governance structure 38 makes a decision as to whether to proceed. Once the reviews are complete, governance structure 38 may make a decision whether to approve proceeding to the next EPO process 36 (or sub-process if applicable), which is the enterprise request management-estimate summary sub-process in this example.

In addition, governance structure 38 may require a formal business value review process of a value proposition. The business value review process may validate the performance of project 18 or program 20, identifying any high-risk areas to be resolved. EPO 22 may notify project or program manager 48 of the decision of governance structure 38. If governance structure 38 does not grant approval to proceed (i.e. stops or redirects project 18 or program 20), a reason and direction to resubmit the request may be given. EPO 22 may have further discussions with project or program manager 48 regarding the impact of the project 18 or program 20 not being approved. If the request for the project 18 or program 20 is approved, the requestor may proceed to the enterprise request management-estimate summary sub-process.

Returning to FIG. 3, the second sub-process of enterprise request management process 36a, the estimate summary sub-process, may be used to submit detailed estimates, funding requirements, and benefits/value for a project or program request, possibly providing a single point of information consolidation for projects 18 and programs 20. This structure may allow for prioritization at appropriate levels of the enterprise. The estimate summary sub-process may be used to refine any rough estimates to help determine funding requirements, and to identify benefits, time lines, and major resource requirements, issues, and risks of projects 18 and programs 20, including the proposed technology approach or recommendation. The estimate summary sub-process may help prevent project 18 or program 20 delays before deployment and help the project or program manager 48 of a project 18 or program 20 to identify critical information.

One or more estimate summary forms may be used to provide a consistent way to document a request for a new project 18 or program 20 in order to assist in ease of decision-making. As discussed above with reference to enterprise request management-initiate request sub-process 47, it may be desirable to categorize a project 18 or program 20 to determine if it falls within the scope of EPO 22 according to certain criteria. It is possible that a project 18 or program 20 may not meet the criteria to be within the scope of EPO 22. If this occurs, a reevaluation process substantially similar to the one discussed above with reference to initiate request sub-process 47 may be executed.

EPO 22 may perform an initial assessment of the detailed estimates, funding requirements, and business benefits/value for a project or program request and update the request log. EPO 22 may provide recommendations to governance structure 38 and schedule and facilitate the reviews with the appropriate governance bodies 44. Project or program manager 48 may receive an e-mail or other communication from EPO 22 indicating the date and time for the scheduled governance structure reviews. Project or program manager 48 may be required to provide information at these reviews. Subsequent to the reviews, EPO 22 may communicate a decision from governance structure 38 indicating that the request was approved, stopped, or redirected.

If the request is approved, the information submitted in the enterprise request management-initiate request sub-process 47 and the enterprise request management-estimate summary sub-process may become the baseline for the approved project 18 or program 20. Any changes to this baseline may be submitted through another suitable EPO process 36, such as enterprise scope management process 36c (discussed below). After approval, project 18 or program 20 may enter into enterprise performance monitoring process 36h or any other suitable EPO process 36 that an approved project 18 or program 20 should follow according to particular needs.

Figure 7:
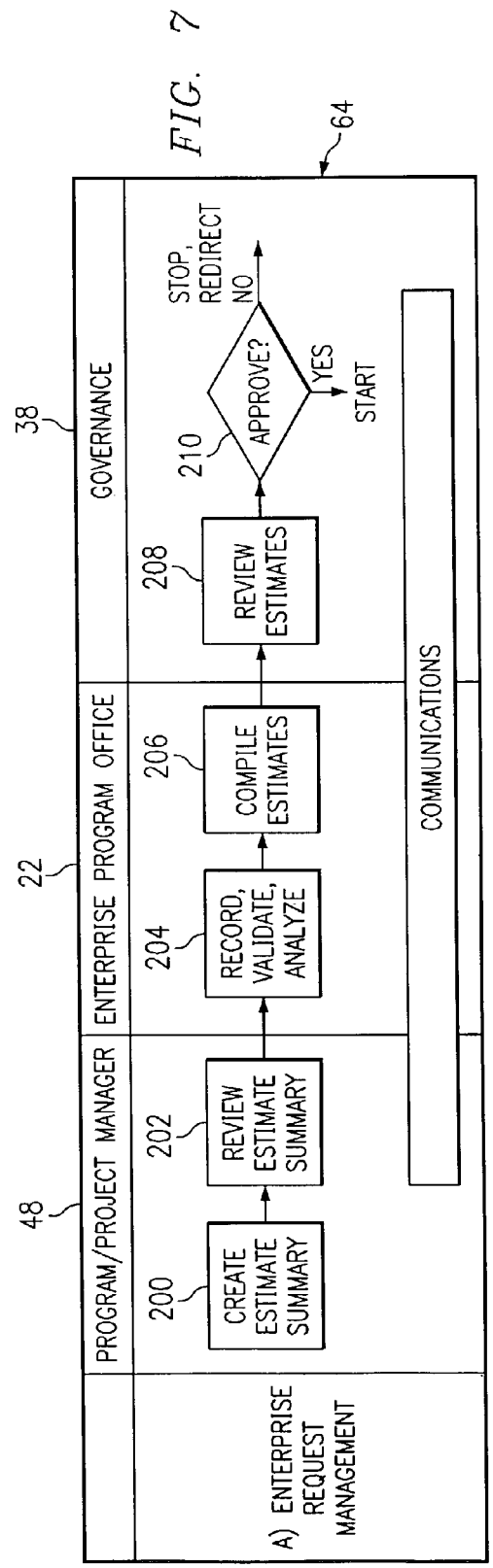
FIG. 7 illustrates an example enterprise request management-estimate summary sub-process.

FIG. 7 illustrates an example enterprise request management-estimate summary sub-process 64. At step 200, a project or program estimate summary is created. In one embodiment, a project or program manager 48 creates the project or program estimate summary. Outputs from project management level 12, program management level 14, or other suitable methodologies may aid in the preparation of the estimate summary. For example, this may include outputs regarding scope management, performance monitoring, financial management, value management, or any other suitable outputs. In addition, a form from program management level 14 describing the benefits of a program 20 may be created, along with a financial breakdown. Step 200 may also include the completion of an estimate summary form, which may accommodate all requests that fall within the scope of EPO 22. The estimate summary form may be part of the initiate request form used to complete the enterprise request management-initiate request sub-process 47. The initiate request form may be updated to include the estimate summary information.

At step 202, the project or program estimate summary may be reviewed. In order to obtain documented approvals, project or program manager 48 may review the estimate summary and other documents that were created at step 200 with any stakeholders 46 and executive sponsors who approved the initiate request form. At step 204, EPO 22 may record, validate, and analyze the project or program estimate summary. EPO 22 may verify approvals of the estimate summary submitted by any stakeholders 46 and executive sponsors and may update the request log and acknowledge receipt of the estimate summary. EPO 22 may also, for example: ensure that a business value review occurred; ensure the estimate summary form is complete; clarify information on the estimate summary form; review the project 18 or program 20 to ensure it is aligned with corporate and organizational strategies; determine if other stakeholders 46 or executive sponsors should review the estimate summary before it is submitted to governance structure 38 (if other reviews are necessary, the estimate summary may be re-submitted after they are approved); determine which governance bodies 44 need to review the estimate summary and when; and provide a recommendation on the priority of the project 18 or program 20 associated with the estimate summary. EPO 22 may document the results of this analysis and the EPO recommendation, and may notify project or program manager 48 of the EPO recommendation and which reviews will take place.

At step 206, EPO 22 may compile the estimates determined at step 202. EPO 22 may submit the request assessment, recommendation, and any supporting documentation generated at step 202 to an appropriate governance structure facilitator, who may add the information to the agenda and distribute it to the appropriate governance structure members. At step 208, governance structure 38 may review the estimate summary compiled and submitted by EPO 22 at step 204. Reviews with governance structure 38 may be prioritized based on outstanding requests across the enterprise. At step 210, governance structure 38 may make a decision whether to approve the project 18 or program 20 for funding and/or to start the project 18 or program 20. Governance structure 38 may address the funding and timing of funds before approval. EPO 22 may notify project or program manager 48 or stakeholders 46 of the decision of governance structure 38. If governance structure 38 does not grant approval to proceed (i.e. stops or redirects the project 18 or program 20), a reason and direction to re-submit the request may be given. EPO 22 may have further discussions with project or program manager 48 regarding the impact of the project 18 or program 20 not being approved. If the project 18 or program 20 request is approved, EPO 22 may contact its associated project or program manager 48 or stakeholders 46 for orientation. Governance structure 38 may also decide that additional business value reviews are required.

Enterprise Scope Management Process

Returning to FIG. 3, enterprise scope management process 36b may be used to bring scope changes of projects 18 or programs 20 to the attention of governance structure 38. The scope of projects 18 and programs 20 may be approved in the enterprise request management-initiate request sub-process 47 or in the enterprise request management-estimate summary sub-process 64. As described above with reference to enterprise request management process 36a, this approved scope may be a shared and agreed-upon high-level understanding by all stakeholders 46 as to why a project 18 or program 20 should be undertaken; what risks may be incurred by undertaking and/or not undertaking the project 18 or program 20; what deliverables will be created to achieve the expected benefits; what the project 18 or program 20 will require to succeed; how and when the project 18 or program 20 will be completed; how much the project 18 or program 20 will cost; what depends on the project 18 or program 20 and what is the project 18 or program 20 dependant upon; or any other suitable issues. A scope change may be anything that affects one or more of these issues, and a scope change may be any alteration to the scope of a project 18 or program 20. In certain embodiments, once the scope of a project 18 or program 20 has been approved (i.e. base-lined), the scope may be refined but may not be expanded or contracted without going through enterprise scope management process 36b. In certain embodiments, work resulting from a scope change of a project 18 or program 20 may not be started before governance structure 38 reviews and approves the scope change. A scope change may require an adjustment to the cost or schedule of the project 18 or program 20 affected by the scope change.

Project or program managers 48 may use a scope change request form to engage EPO 22 and governance structure 38 in scope changes of projects 18 and programs 20. Enterprise scope management process 36b may ensure scope changes affecting projects 18 and programs 20 are identified, approved, managed, and implemented in an appropriate manner, and may collect metrics data on the effectiveness of the process for governance structure 38. The information tracked by project management level 12 and program management level 14 may be available to EPO 22 during execution of enterprise scope management process 36b. Specifically, it may be preferable for a scope management log of a project 18 or program 20 to be current and available to EPO 22 if requested. EPO 22, as part of its oversight function, may periodically review and coordinate impact analysis of the scope management logs of projects 18 and programs 20 to ensure scope changes are being managed per the standards determined in project management level 12 and program management level 14. Furthermore, EPO 22 may collaborate with various other internal organizations, provide a way to escalate scope changes of projects 18 and programs 20 to governance structure 38, or take any other suitable measures. The identification, approval, management, and implementation of necessary scope changes to projects 18 and programs 20 may be the responsibility of the project or program manager 48 of a particular project 18 or program 20. In certain embodiments, scope changes may be identified at any level of the organization, including by EPO 22 and governance structure 38; however, it may be desirable to manage scope changes at the lowest organizational level possible.

Approval by governance structure 38 may be required to approve a scope change when certain thresholds of change are exceeded. It may be desirable for governance structure 38 to review these thresholds, and reset them if necessary. The thresholds may apply to the scope change of an individual project 18 or program 20, or to the aggregate scope change for all projects 18 and programs 20 affected by the scope change. For example, if a scope change requires one hundred effort-hours within a project 18 or program 20 but causes six hundred effort-hours of work within dependant projects 18 or programs 20, then the scope change may exceed a schedule change threshold and requires approval. Additionally, if a project 18 or program 20 experiences several scope changes that are below the threshold but would exceed the threshold when summed, the scope changes may be combined in a change package. This change package may be escalated for approval. For example, if a project 18 or program 20 has four changes that require one hundred fifty effort-hours each (a total of 600 effort-hours), a change package may be created to include all four changes when the fourth change is needed.

Figure 8:
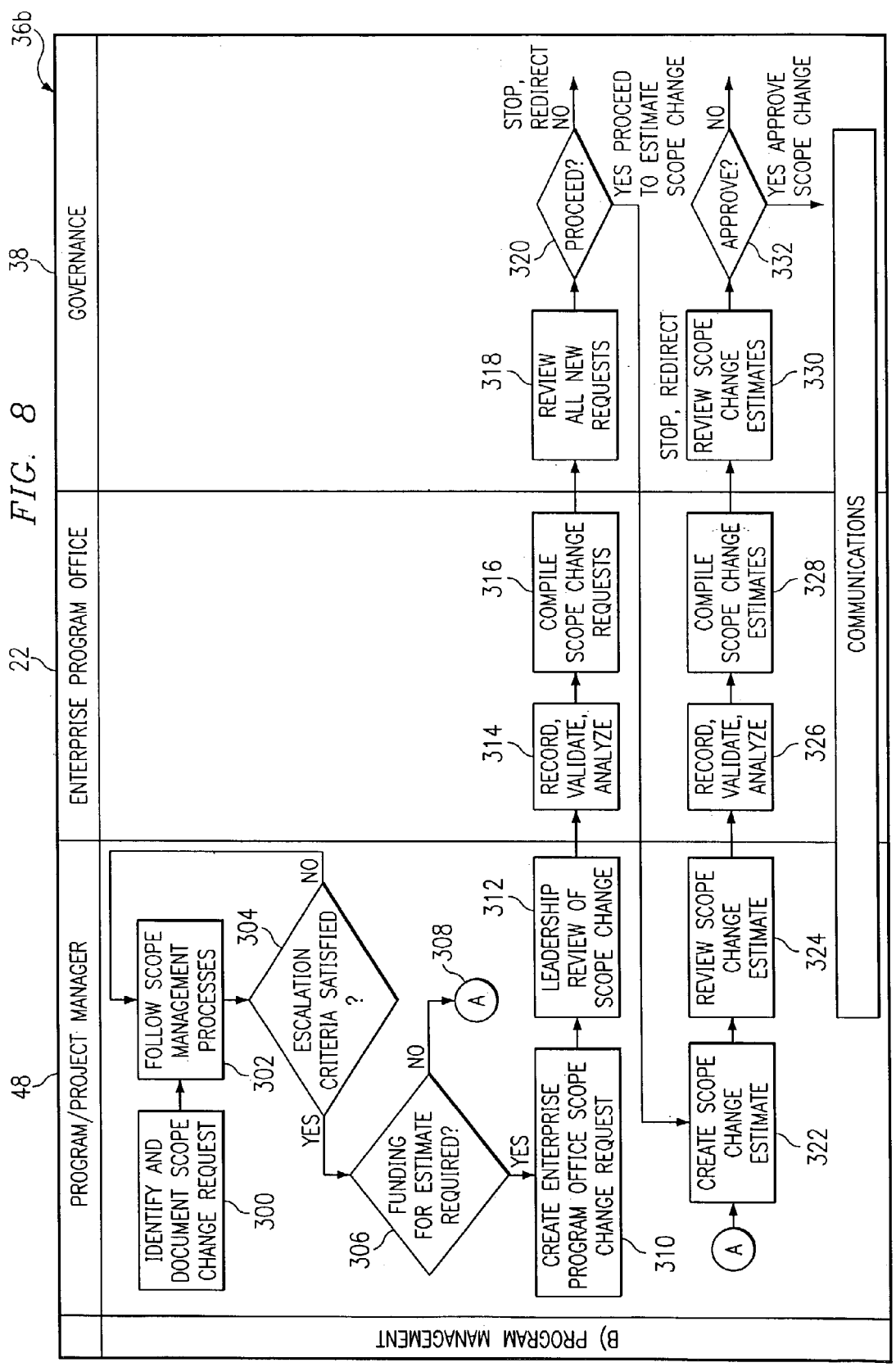
FIG. 8 illustrates an example enterprise scope management process.

FIG. 8 illustrates an example enterprise scope management process 36b. At step 300, a project or program manager 48 may identify and document a need for a scope change. This may be done using scope change management processes established in project management level 12 and program management level 14. At step 302, project or program manager 48 may follow enterprise scope management processes established in project management level 12 and program management level 14. For example, scope change management processes at project level 12 may be used for project 18-level scope changes, while scope change management processes at program management level 14 may be used for program 20-level scope changes.

At step 304, project or program manager 48 may decide whether the scope change exceeds EPO 22 thresholds. In certain embodiments, if a scope change exceeds one or more of the predefined thresholds, the scope change must be escalated to EPO 22. At step 306, project or program manager 48 may decide if additional funding is needed to complete an estimate for the scope change. If the scope change is of sufficient magnitude that developing an estimate for the scope change may not be covered by the existing budget for the project 18 or program 20, then the project or program manager 48 may request additional funding for the creation of the estimate.

At steps 310 and 322, if the scope change exceeds one or more of the predetermined thresholds, then project or program manager 48 may create and submit a scope change request form to EPO 22. Depending on the procedure set up between governance structure 38 and project or program manager 48 as part of the initiation of the project 18 or program 20, the governance structure 38 may require a review of scope change requests before submission to EPO 22 (see step 312 below). This review step may not affect that submission of a scope change request may be required if the project 18 or program 20 exceeds one or more of the predetermined thresholds. If additional funding to create the estimate is determined to be necessary at step 306, project or program manager 48 may complete only a portion of the scope change form at step 310. If the estimate has already been created, project or program manager 48 may complete the entire scope change form at step 322.

At steps 312 and 324, the scope change request may undergo a review step. This review may be conducted by a third part such as a change control structure or stakeholder 46 at step 312, or by the program or project manager 48 at step 324 before the request is forwarded to EPO 22. At steps 314 and 326, EPO 22 may record, validate, and analyze the scope change request. This may involve EPO 22 notifying project or program manager 48 of receipt of the scope change request form, conducting further research (e.g., impact analysis) if necessary, and creating a recommendation on the scope change request. At steps 316 and 328, EPO 22 may compile one or more of the scope change requests received for a reporting period that will be escalated to governance structure 38, as well as review prioritization and any recommendations of EPO 22, and escalate them to an appropriate governance body 44.

At steps 318 and 330, governance structure 38 may review the scope change requests and corresponding EPO 22 recommendations. Governance structure 38 may decide that the scope change request is completely or partially approved, the scope change request is denied, the scope change request should be forwarded to a different governance structure 38 with a communication including the reason the request is being forwarded and/or a request for a specific action to be taken, or that any other suitable action should be taken. At steps 320 and 332, governance structure 38 may decide on the scope change request, and EPO 22 may communicate the decision of governance structure 38 to project 18, program 20, or project or program manager 48. Before approving a scope change, governance structure 38 may address the sources and timing of any required funding for the scope change. If the request was for additional funding needed to create an estimate, then the project or program manager 48 of the relevant project 18 or program 20 may need to proceed through steps 322-332.

Enterprise Communication Management Process

Returning to FIG. 3, enterprise communication management process 36c may include a communication management plan to facilitate effective operation of EPO 22. The communication management plan described below is presented as an example only. This communication management plan may be modified according to particular needs to allow EPO 22 to share information with project and program managers 48 and governance structure 38. The communication management plan may facilitate the flow of information regarding projects 18 and programs 20, which may be paramount to efficient and successful execution of projects 18 and programs 20, and successful tracking and reporting by EPO 22. The information may be coordinated through all EPO processes 36 and may affect governance structure 38, oversight, and executive leadership. EPO 22 may be responsible for ensuring accurate and timely updates on the progress of each project 18 and program 20 and reporting to governance structure 38. For projects that fall within the scope of EPO 22, project and program managers 48 may expect that: status reporting may be required throughout the life cycle of a project 18 or program 20; health checks may be required throughout the life cycle of a project 18 or program 20 (a health check may be an assessment designed to provide ongoing insight of the management practices of projects 18 and programs 20); corrective action plans may be required for actions identified during health checks or business value reviews; methodologies from project management level 12 and program management level 14 may be implemented; new project 18 and program 20 requests may be processed through enterprise request management 47; performance monitoring may include approval, updates, and governance structure 38 decisions and feedback; benefits/value monitoring may include providing status and reporting of project 18 and program 20 benefit/value realization; and any other suitable expectations.

Figure 9:
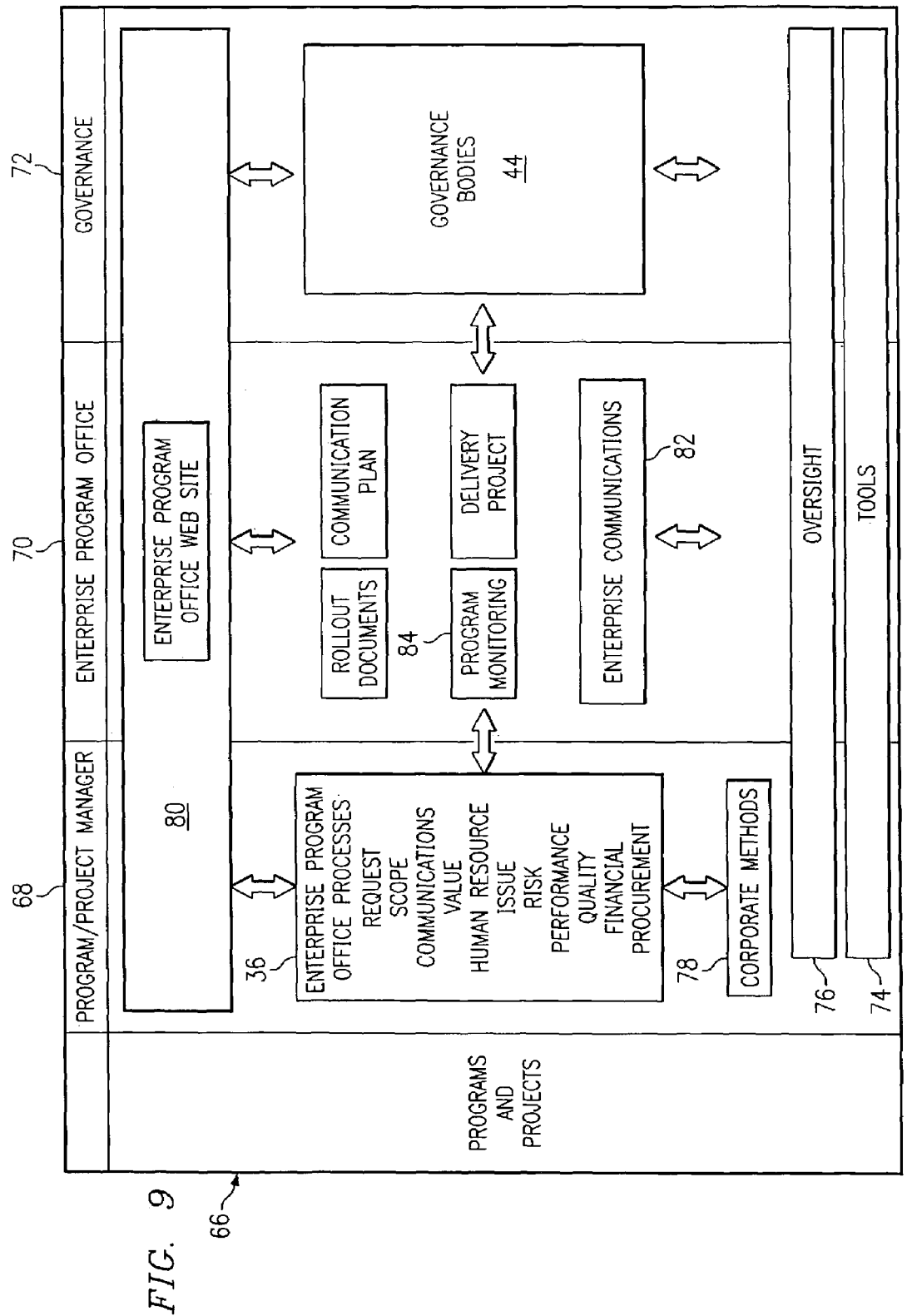
FIG. 9 illustrates an example enterprise communication management plan and example interdependencies of manager interfaces, EPO interfaces, and governance interfaces.

FIG. 9 illustrates an example communication management plan 66 and example interdependencies of manager interfaces 68, EPO interfaces 70, and governance interfaces 72. Manager interfaces 68 may include project or program interfaces with EPO processes 36, automated tools 74, EPO oversight 76, corporate methods 78, and an EPO web site 80, or any other suitable interfaces. According to the project or program interface with EPO processes 36, it may be desirable for project and program managers 48 to be well versed with corporate standards for management of projects 18 and programs 20. In addition, it may be preferable for project or program managers 48 to understand and use EPO processes 36. With respect to the project or program interface with automated tools 74, a project- or program-reporting dashboard may be an automated tool 74 used for project or program tracking, such as a mechanism for capturing and reporting various performance indicators. The project- or program-reporting dashboard may require information about a project 18 or program 20 to be set up at the beginning of project or program management. The required information may include overview, budget, number of resources expended, and other issues for projects 18 or programs 20. The fully established project 18 or program 20 setup in project- or program-reporting dashboard, possibly along with regular updates on project or program status, may be the basis for executive status and reporting. Additionally, this information may be used to analyze benefit/value realization due to a project 18 or program 20.

According to the project or program interface with EPO oversight 76, projects 18 and programs 20 may need to provide selected project or program management deliverables for the EPO oversight process. The intent of EPO oversight 76 is to review standard project and program components. The two primary forms of EPO oversight 76 may be business value reviews for key projects 18 or programs 20 and health checks. In either case, deficiencies may require a corrective action plan, which may need to be completed for project 18 or program 20 to proceed. According to the project or program interface with corporate methods 78, projects 18 or programs 20 may be expected to use the appropriate corporate methods 78 during certain phases. The tools and techniques to be employed by projects 18 or programs 20 may include methodologies developed in project management level 12 and program management level 14. According to the project or program interface with EPO web site 80, EPO web site 80 may provide a central repository and guide for information, tools, processes, and techniques necessary for projects 18 or programs 20. EPO web site 80 may be used to educate project or program managers 48 about the role of EPO 22; find and download EPO processes 36; receive the status on requests, changes, issues, and risks; review the integrated project or program schedule; access related web sites; access web sites implementing methodologies associated with project management level 12 and program management level 14; and for any other suitable purpose.

EPO interfaces 70 may include interfaces with EPO processes 36, automated tools 74, EPO oversight 76, governance bodies 44, enterprise communications 82, EPO web site 80, program monitoring 84, or any other suitable interfaces. According to EPO interface with EPO processes 36, EPO processes 36 may be created with input from corporate methods 78, industry best practices, and the collective experience of various project or program teams. Each EPO process 36 may include a process model, written procedures, templates, and links, and may be available online using EPO web site 80 for use by projects 18 or programs 20. According to the EPO interface with automated tools 74, project or program manager 48 may enter new projects 18 or programs 20 into the project- or program-reporting dashboard. This initial information may come primarily from the scope and value proposition documents. Project or program manager 48 may also make the project- or program-reporting dashboard updates. Project- or program- reporting dashboard training and documentation may be available online using EPO web site 80. The project or program data entered into the reporting dashboard may be the foundation for all reporting and tracking done by EPO 22. EPO 22 staff may assist project or program manager 48 as necessary to effectively load and maintain the project or program profile and status information.

According to the EPO interface with EPO oversight 76, business value reviews may be one form of EPO oversight 76. Business value reviews may be required at the end of a project or program management phase. In addition, health checks may be required at any phase of a project 18 or program 20, and they may be self-assessments or assessments by members of EPO 22. According to the EPO interface with governance bodies 40, EPO 22 may direct the channel of information between the projects 18 or programs 20 and governance structure 38. This function may include providing notification of governance structure decisions, providing consolidated reporting on one or more projects 18 or programs 20, conducting and reporting on business value reviews, conducting and reporting on health checks, and any other suitable functions. According to the EPO interface with enterprise communications 82, EPO 22 may provide input to announcements posted using EPO web site 80 or otherwise communicated to the enterprise. This data is provided as requested and is distributed by enterprise communications 82. In addition, a variety of project or program information suitable for wide-audience distribution may be distributed through enterprise communications 82.

The EPO interface with EPO web site 80 may include EPO process 36 input, training documents, tailoring project outputs, and program monitoring 84. EPO process 36 input may include the EPO processes 36 available using EPO web site 80. The training documents may include electronic presentations suitable as overviews or for training, and may be made available using EPO web site 80. The outputs from tailoring EPO processes 36 may be located in a project workbook available using EPO web site 80. Program monitoring 84 may include handling a number of reporting deliverables, which may exist with input from EPO processes 36. This may include project- or program-reporting dashboard updates; project or program schedule updates; and any issues, risks or changes for the reporting period. Project and program managers 48 may be expected to provide data and input for the above reports. For example, project or program managers 48 may be require to report project- or program-reporting dashboard updates as changes occur, schedule and milestone progress and accomplishments, any new issues or issue resolution, any new risks or risk status updates, any changes to scope or financial status, or any other suitable data.

Governance interfaces 72 may include an interface with EPO 22 or any other suitable interfaces. According to governance interface with EPO 22, it may be preferable for EPO 22 to provide governance structure administration from initiation of a project 18 or program 20 to benefit/value realization from project 18 or program 20. This may be executed in any suitable way and be as comprehensive as desired. It may be required that EPO communication with governance structure 38 be documented, comprehensive, and provide for administration. Governance interface with EPO 22 may include setting agendas based on submitted requests and escalated items; facilitating meetings with a governance structure 38 sponsor; maintaining minutes and proceedings, recorded and referenceable; maintaining decision and action item logs; maintaining meeting processes and templates; and any other suitable features.

Enterprise Issue Management Process

Returning to FIG. 3, enterprise issue management process 36f may be used to bring project or program issues to the attention of governance structure 38. An issue may be anything that may adversely affect the success of project 18 or program 20. For example, an issue may be a point of controversy, debate, or concern such as a matter in dispute. Issue resolution may be the responsibility of project or program managers 48. Issues may be identified at any level of the organization, including by EPO 22 and governance structure 38. It may be preferable for issues to be resolved at the lowest organizational level possible. In one embodiment, an issue that cannot be resolved at any particular level of the organization should be escalated to a higher level to ensure the issue is brought to the attention of appropriate parties and resolved.

Project and program managers 48 may use an issue management escalation form to engage EPO 22 and governance structure 38 on project or program issues. In one embodiment, unresolved issues should be escalated to the next level of leadership within a predetermined period of time after the target resolution date or if the unresolved issues meet enterprise escalation criteria such as affecting more than one project 18 or program 20. Enterprise issue management process 36*f* may ensure that issues affecting projects 18 or programs 20 are identified, managed, and resolved in an appropriate manner and collect metrics data on the effectiveness of the process for governance structure 38. It may be preferable for each project 18 or program 20 to follow the methodologies of project management level 12 and program management level 14. Specifically, the issue management log of a project 18 or program 20 should be current and available to EPO 22 if requested. EPO 22, as part of its oversight function, may periodically review the issue management log of a project 18 or program 20 to ensure issues are being managed per the standards of project management level 12 and program management level 14. As an example, EPO 22 may be involved in issue resolution (pending governance structure approval) if an issue affects more than one project 18 or program 20, if an issue is not resolvable at the project or program level, if an issue has not been resolved within a predetermined maximum time frame of the specified target date, or for any other suitable reason according to particular needs. To accomplish these tasks, EPO 22 may conduct a periodic review of the issue log of each project 18 or program 20, collaborate with various other organizations and/or stakeholders, provide a way to escalate project or program issues to governance structure 38, and carry out any other suitable functions.

Figure 10:
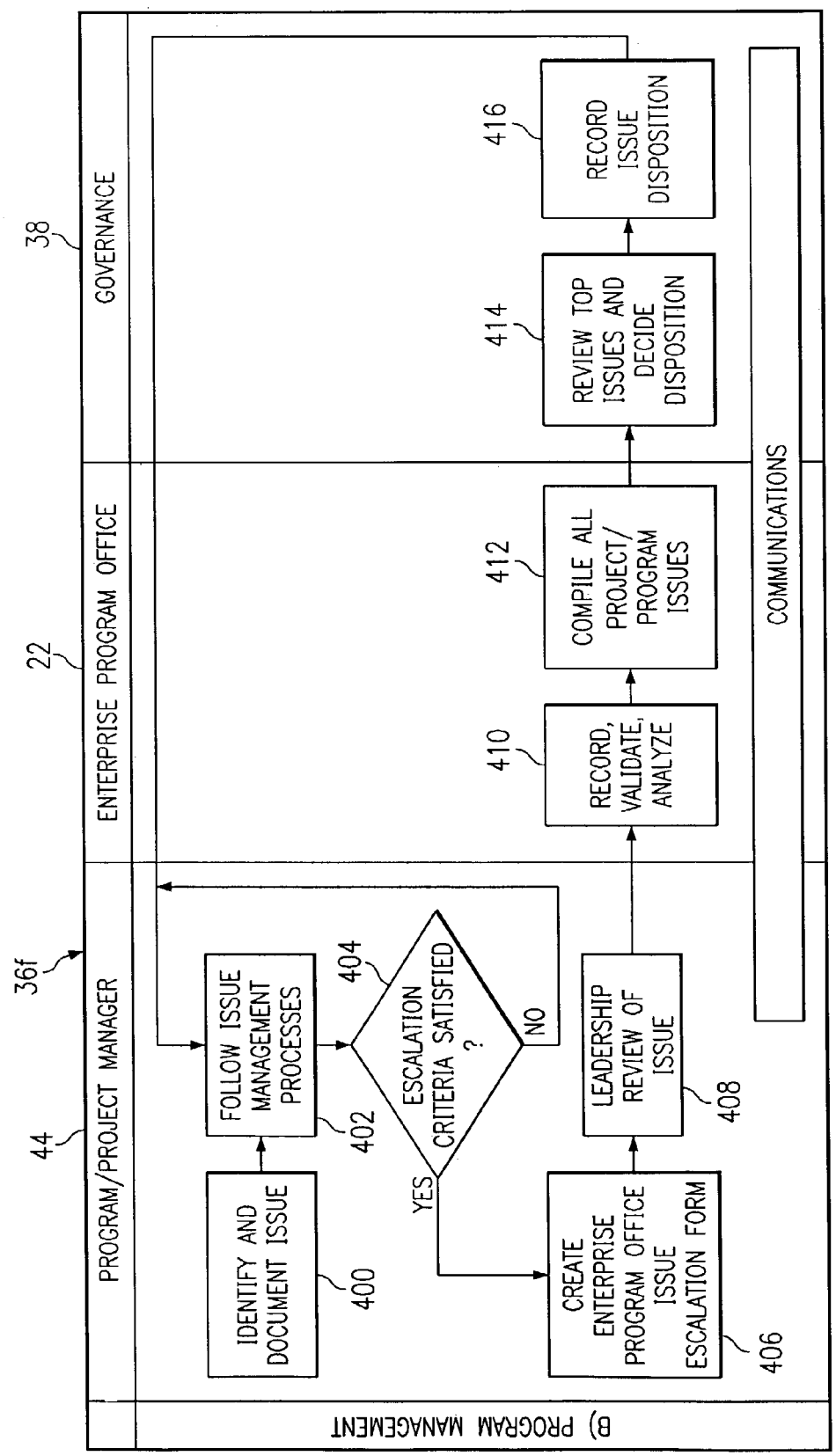
FIG. 10 illustrates an example enterprise issue management process.

FIG. 10 illustrates an example enterprise issue management process 36*f*. At step 400, a project or program manager 48 may identify and document an issue associated with a project 18 or program 20. In one embodiment, project or program manager 48 may document the issue using the methodologies of project management level 12 and program management level 14. At step 402, project or program manager 48 may follow the enterprise issue management processes of project management level 12 and program management level 14. The enterprise issue management process for project management level 12 should be used for project-level issues, while the enterprise issue management process for program management level 14 should be used for program-level issues. At step 404, project or program manager 48 may decide if the issue satisfies the escalation criteria of EPO 22. If the issue satisfies the escalation criteria of EPO 22, project or program manager 48 may create and submit an issue management escalation form to EPO 22 at step 406. At step 408, the issue request may undergo a review step. This may occur if required by a third party (such as the project or program sponsor) or by the project or program manager 48 before the request is forwarded to EPO 22.

At step 410, EPO 22 may record, validate, and analyze the issue escalation request. EPO 22 may notify project or program manager 48 of receipt of the issue escalation request, conduct further research if necessary, create a recommendation on the issue escalation request, and perform any other suitable functions. At step 412, issue escalation requests that will be escalated to governance structure 38 may be compiled by EPO 22, along with the recommendations of EPO 22. At step 414, governance structure 38 may review issue escalation requests and EPO recommendations, and make a decision regarding the issue escalation request. Governance structure 38 may review the issue escalation requests in a substantially similar manner to that described above with reference to FIG. 7. Governance structure 38 may decide that it can resolve the issue, that the issue can be remanded to project or program manager 48 with specific action items to be taken to resolve it, that the issue can be forwarded to a different governance body 44 with a communication including the reason the issue is being forwarded and/or a request for a specific action to be taken, or that other suitable action should be taken. At step 416, EPO 22 may communicate the decision of governance structure 38 to project or program manager 48.

Risk Management

Returning to FIG. 3, enterprise risk management process 36*g* may be used to escalate risks associated with projects 18 and programs 20 to the attention of governance structure 38. A risk may be anything that may adversely affect the success of a project 18 or program 20, but its occurrence is still uncertain. For example, a risk may be a potential situation that might jeopardize, delay, or negatively impact a project 18 or program 20. Enterprise risk management process 36*g* may be the responsibility of project or program manager 48. Risks may be identified at any level of the organization, including by EPO 22 and governance structure 38. It may be desirable for risks to be managed at the lowest organizational level appropriate. In one embodiment, a risk that cannot be managed at any particular level of the organization must be escalated to ensure the risk is brought to the attention of appropriate parties and managed effectively.

Enterprise risk management process 36*g* may ensure that risks affecting projects 18 or programs 20 are identified and managed in an appropriate manner and collect metrics data on the effectiveness of the process for governance structure 38. It may be preferable for each project 18 and program 20 to follow the methodologies of project management level 12 and program management level 14, respectively. Specifically, the risk management log of a project 18 or program 20 should be current and available to EPO 22 if requested. EPO 22, as part of its oversight function, may periodically review the risk management log of a project 18 or program 20 to ensure risks are being managed per the standards of project management level 12 and program management level 14. As an example, EPO 22 may be involved in risk resolution (pending governance structure approval) if an effective risk response cannot be developed by project or program manager 48, a risk plan has not been created within a predetermined maximum time period from the specified target date, an identified risk has not been acted upon within a predetermined maximum time period from the specified target date, or for any other suitable reason according to particular needs.

Figure 11:
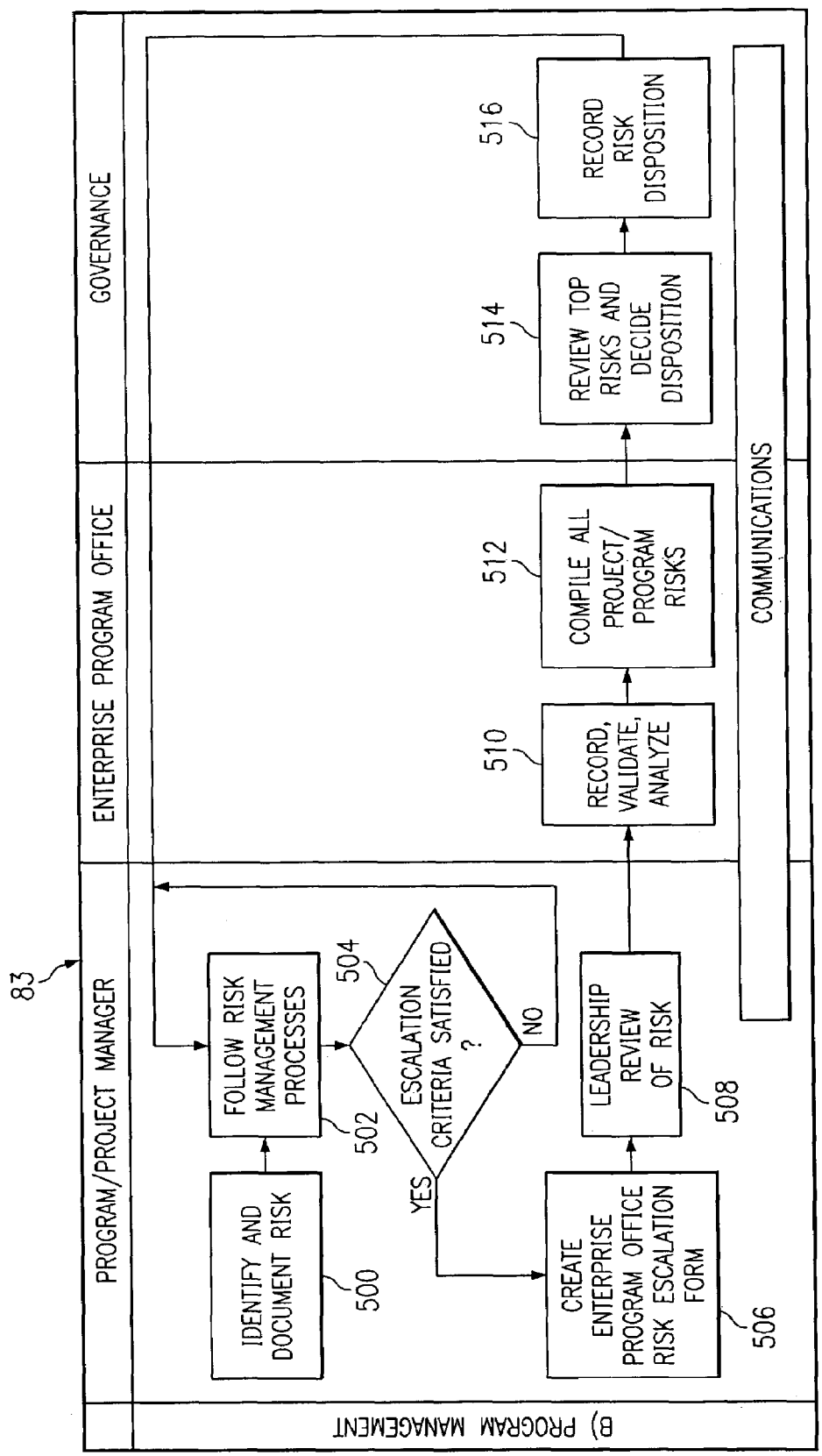
FIG. 11 illustrates an example enterprise risk management process.

FIG. 11 illustrates an example enterprise risk management process 36*g*. At step 500, a project or program manager 48 may identify and document a risk associated with a project 18 or program 20. In one embodiment, project or program manager 48 may document the risk using the enterprise risk management processes of project management level 12 and program management level 14. At step 502, project or program manager 48 may follow the enterprise risk management processes of project management level 12 and program management level 14. In one embodiment, the enterprise risk management process of project management level 12 should be used for project-level risks, while the enterprise risk management process of program management level 14 should be used for program-level risks. At step 504, project or program manager 48 may decide if the risk satisfies the escalation criteria of EPO 22. If the risk satisfies the escalation criteria, project or program manager 48 may create and submit a risk management escalation form to EPO 22 at step 506. At step 508, the escalated risk request may undergo a review step. This may occur if required by a third party (such as the sponsor of project 18 or program 20) or by project or program manager 48 before the request is forwarded to EPO 22.

At step 510, EPO 22 may record, validate, and analyze the risk management escalation form. EPO 22 may notify project or program manager 48 of receipt of the risk management escalation form, conduct further research if necessary, create a recommendation on the risk, and perform any other suitable functions. At step 512, EPO 22 may compile one or more escalated risks and EPO recommendations regarding the risks for governance structure review. At step 514, governance structure 38 may review escalated risks and their corresponding EPO recommendations, and make a decision regarding the risks. Governance structure 38 may review the risk escalation requests in a substantially similar manner to that described above with reference to FIG. 7. Governance structure 38 may decide that the risk can be recognized by governance structure 38, that the risk can be assigned to the appropriate project or program manager 48 with specific action items to be taken to mitigate it, that the risk can be forwarded to a different governance body 44 with a communication including the reason the risk is being forwarded and/or a request for a specific action to be taken, or that other suitable action should be taken. At step 516, EPO 22 may communicate the decision of governance structure 38 to project or program manager 48.

Enterprise Performance Monitoring Process

Returning to FIG. 3, enterprise performance monitoring process 36*h* may be used to understand integration points at a program level and to show interdependencies. Each project or program manager 48 may be required to create and maintain a schedule that includes common EPO requirements, and submit progress status to EPO 22 as required to reflect current status of projects 18 and programs 20. Enterprise performance monitoring process 36*h* may provide a common schedule status and reporting structure for any project 18 or program 20 that is identified to be monitored. In one embodiment, EPO 22 requires that each project 18 or program 20 have and regularly update a schedule, each schedule has common EPO milestone standards incorporated for enterprise consolidation and status reporting, inter-project or inter-program dependencies are identified and tracked, and other suitable information is reported. For example, this reporting schedule may include establishing and regularly updating project- or program-reporting dashboards as discussed above with reference to FIG. 9. Through this common reporting structure, EPO 22 may be able to combine project and program schedules to complete a high-level integrated enterprise schedule that may be reviewed by governance structure 38 and other stakeholders 46, providing integrated visibility into projects 18 and programs 20.

Figure 12:
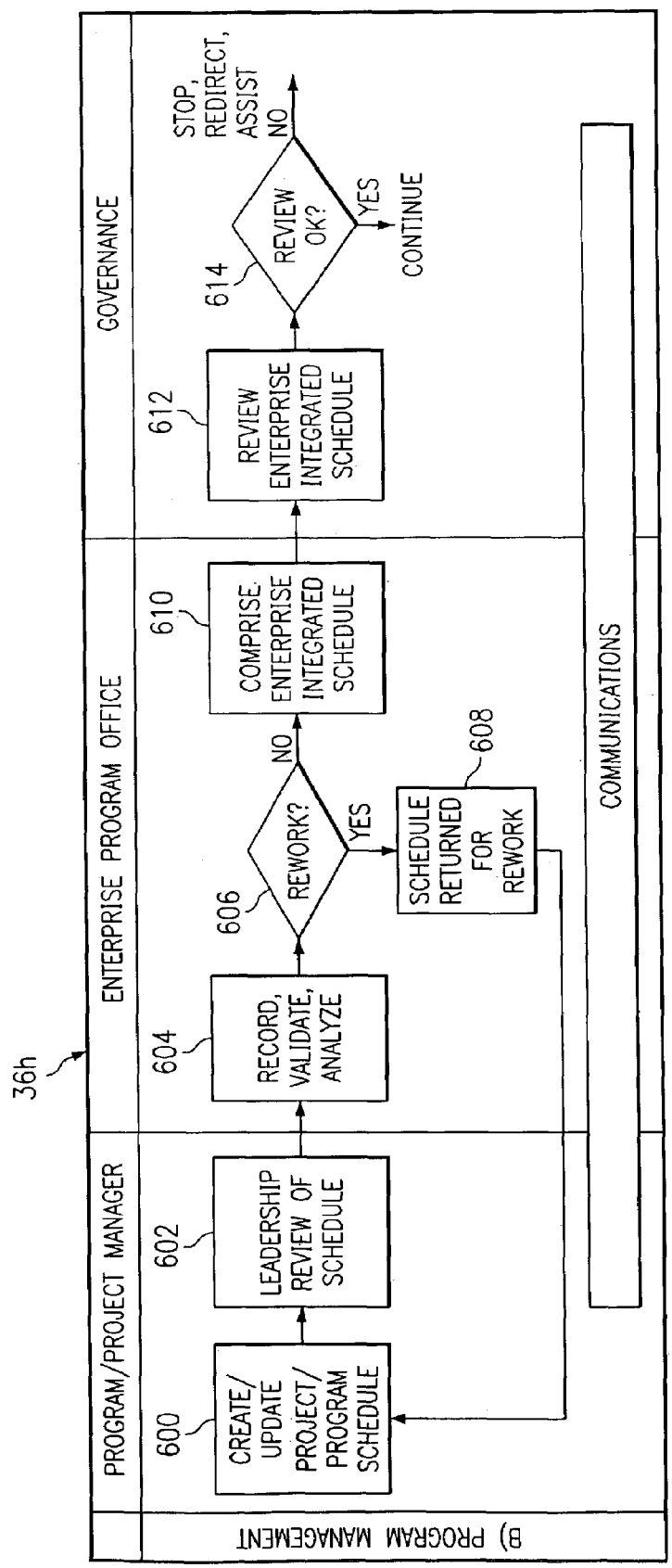
FIG. 12 illustrates an example enterprise performance monitoring process.

FIG. 12 illustrates an example enterprise performance monitoring process 36*h*. In certain embodiments, enterprise performance monitoring process 36*h* may begin following formal approval of a project 18 or program 20 through enterprise request management process 36*a*. In one embodiment, enterprise performance monitoring process 36*h* may be divided into two distinct phases; an initial schedule build phase and an ongoing schedule maintenance phase.

At step 600 of the initial schedule build phase, a project or program schedule may be created. Project 18 or program 20 may construct the schedule from high-level milestones that may be submitted for approval during enterprise request management process 36*a*. These milestones may include significant events during project 18 or program 20 such as, for example, the completion of a deliverable. In certain embodiments, all dates must mirror dates found in the request management forms or approved changes submitted through enterprise scope management process 36*b*. It may be necessary for a project or program manager 48 to reconcile that the completion date of the project or program schedule is correct. Furthermore, certain milestones may be used to communicate significant events including benefits/value realization and requirements implementation. It may be necessary for certain milestones to be tracked by every project 18 or program 20 for the enterprise view, and some may need to be synchronized with benefits/value realization and requirements implementation. These milestones may include the start of a project 18 or program 20, the completion of a start-up phase, the completion of a planning phase, the completion of an execution phase, one or more release deployments, the completion of a closedown phase, and any other suitable milestones according to particular needs. If formal business value reviews are necessary, the milestones may be added.

At step 602, leadership may review the project or program schedule. Project or program manager 48 may review the schedule with others such as the team, peers, external stakeholders 46, and executive sponsors before sending it to EPO 22. In certain embodiments, this step may be optional. When the review is complete, project or program manager 48 sends the project or program schedule to EPO 22. At step 604, EPO 22 may record, validate, and analyze the project 18 or program 20 schedule. If the project 18 or program 20 schedule is missing any required milestones, the schedule may be sent back for rework. EPO 22 may ensure that all necessary information is on the schedule, reference the dates from the enterprise request management sub-processes —initiate request and estimate summary to verify consistency, and analyze the components of the schedule for completeness. At step 606, if questions arise and/or rework is deemed necessary, an EPO performance monitoring coordinator may contact project or program manager 48 and the method proceeds to step 608. The EPO performance monitoring coordinator may notify project or program manager 48 that rework is necessary and what is needed to correct the problem. If no rework is necessary at step 606, the method proceeds to step 610.

At step 610, the EPO performance monitoring coordinator may compile and integrate the approved project or program milestone schedules for presentation to one or more governance bodies 44 to meet the needs of governance structure 38. EPO 22 may perform analysis and integrate with other EPO processes 36. At step 612, governance structure 38 may review the enterprise-integrated schedule. At step 614, if the governance structure review is satisfactory, any necessary feedback and information may be communicated by EPO 22 to project or program manager 48 and other appropriate parties. If the review is unsatisfactory, governance structure 38 may choose to start, stop, redirect, or assist project 18 or program 20 based on the information collected by enterprise performance monitoring process 36*h* and any other suitable EPO processes 36. An ongoing schedule maintenance phase of enterprise performance monitoring process 36*h* may include substantially similar steps. The ongoing schedule maintenance phase may help ensure that projects 18 or programs 20 remain on track, considering current milestone completion dates.

Enterprise Financial Management Process

Returning to FIG. 3, enterprise financial management process 36*j* may be used to capture select project- or program-level financial data and report financial information to various EPO 22 constituencies. Enterprise financial management process 36*j* may establish minimum project or program financial management standards in collaboration with other organizations; monitor the financial management of approved projects 18 or programs 20 in progress; capture financial progress data of approved projects 18 or programs 20 in progress in collaboration with other internal or external organizations; report financial information to stakeholders 46; develop an integrated financial management view across projects 18 or programs 20 under EPO oversight 76; collect metrics data on the effectiveness of the process for governance structure 38; and perform any other suitable functions. Enterprise financial management process 36j may track cost data at the benefit/value and requirement levels. Benefits/value realization which tracks the financial benefits/value derived from projects 18 or programs 20 may be the task of a value management EPO process 36 (shown in FIG. 3).

The initial cost estimate and financial cost model for a project 18 or program 20 may be developed as part of enterprise request management process 36a. Enterprise financial management process 36j may create a more detailed project or program financial plan or budget.

To accomplish its objectives, EPO 22 may capture monthly selected data for approved projects 18 or programs 20 in progress, periodically review the financial management tracking and reporting systems of each project 18 or program 20, collaborate with various other organizations, and perform any other suitable functions according to particular needs. Project or program manager 48 may be responsible for the budget or other financial plan of project 18 or program 20 and for meeting the requirements of enterprise financial management process 36j.

It may be desirable for all projects 18 or programs 20 to follow the practices of project management level 12 and program management level 14, and the information tracked by these practices may be made available to enterprise financial management process 36j. For example, the financial plan, master schedule, and cost information of projects 18 or programs 20 should be current and available to EPO 22 on request. EPO 22, as part of its oversight function, may periodically review the financial plan, master schedule, and cost information of a project 18 or program 20 to ensure project or program finances are being managed according to the standards of project management level 12 and program management level 14.

As described in this document, there are two kinds of benefits —financial and non-financial. To be considered a "benefit," the value and achievement of the benefit must be measurable (that is, financial benefits return a dollar value, non-financial benefits return a metric value). "Requirement" is used to denote an item that a project 18 or program 20 provides, but whose value and/or achievement may not be measurable. Requirements may be reserved for legally mandated or other mandatory types of work, such as contractual obligations. Within enterprise financial management process 36j, financial and cost information may be captured and analyzed only for benefits. This information is used to develop financial measures (such as return on investment (ROI), effects on corporate profitability, and return on time). For requirements, only cost information may be tracked. This information is focused primarily on cost variance analysis. In general, projects 18 or programs 20 should provide benefits.

In one embodiment, enterprise financial management process 36j involves an overall process of financial tracking, which actually begins during enterprise request management process 36a. For example, within enterprise request management process 36a, certain project or program details may be specified, for example: expected high-level benefits and requirements; how benefit achievement is defined and measured; expected resources needed (costs); expected completion timeframe (preliminary schedule) for each expected benefit, requirement, or project or program deliverable; sources of funds for project 18 or program 20; and any other suitable items. To make sound financial decisions about proposed projects 18 or programs 20, it may be necessary to capture these items at the benefit and requirement level. That is, it may be necessary to define the expected value, cost, and completion timeframe for each benefit and requirement provided by project 18 or program 20. Enterprise request management process 36a may result in setting initial project or program baselines. These baselines may be used to perform financial and cost variance analysis on the ongoing progress of project 18 or program 20. In certain embodiments, these baselines may be refined, but cannot be expanded or contracted without going through enterprise scope management process 36b.

The set-up of project or program financial tracking may continue into enterprise performance monitoring process 36h. Enterprise performance monitoring process 36h may add a level of sophistication to financial tracking usually not required below this level. In project- or program-level work, the master schedule may be broken down to show how each expected benefit and requirement may be created. Each benefit or requirement may be broken down into the one or more deliverables that create the benefit or requirement and the one or more releases in which the deliverables will be implemented. Additionally, assuming that a release is paired with a schedule milestone, a schedule milestone may be created to show when each benefit or requirement becomes available or in which release it will become available. This information may enable costs to be matched to the benefit or requirement provided, enable the tracking of progress on a benefit- or requirement-specific basis, enable management of benefits realization, enable value analysis, and enable other suitable functions. It may be desirable to schedule activities on a benefit or requirement-specific basis. For activities that cross multiple benefits or requirements, such as for example an initial meeting or software modules used in multiple places, a cost-allocation scheme may be beneficial.

Financial tracking may also extend into enterprise financial management process 36j. In one embodiment, approved projects 18 or programs 20 must provide EPO 22 with information so that EPO 22 can develop an integrated financial view of ongoing project or program activity and monitor the financial progress of projects 18 or programs 20. This information may include, for example: a list of benefits or requirements project 18 or program 20 provides (source: the approved request from enterprise request management process 36a); how benefits achievement and value will be measured (source: the approved request); the sources and timing of funding (source: the financial plan of the project or program budget); the total budget allocated to each benefit or requirement (source: the financial plan of project 18 or program 20); when benefits or requirements and deliverables will be completed (source: the master schedule milestones); and, on a monthly basis, total costs incurred for each benefit or requirement for variance analysis (budgeted vs. actual costs) (source: the master schedule and cost tracking).

It may be desirable for EPO 22 to generate this information internally (for example, from enterprise request management process 36a and enterprise performance monitoring process 36h). However, it may be the responsibility of a project or program manager 48 to provide the information upon request and to inform EPO 22 of changes in the information through other EPO processes 36 (for example, enterprise scope management process 36b, enterprise issue management process 36f, enterprise risk management process 36g, and performance monitoring 36h).

Figure 13:
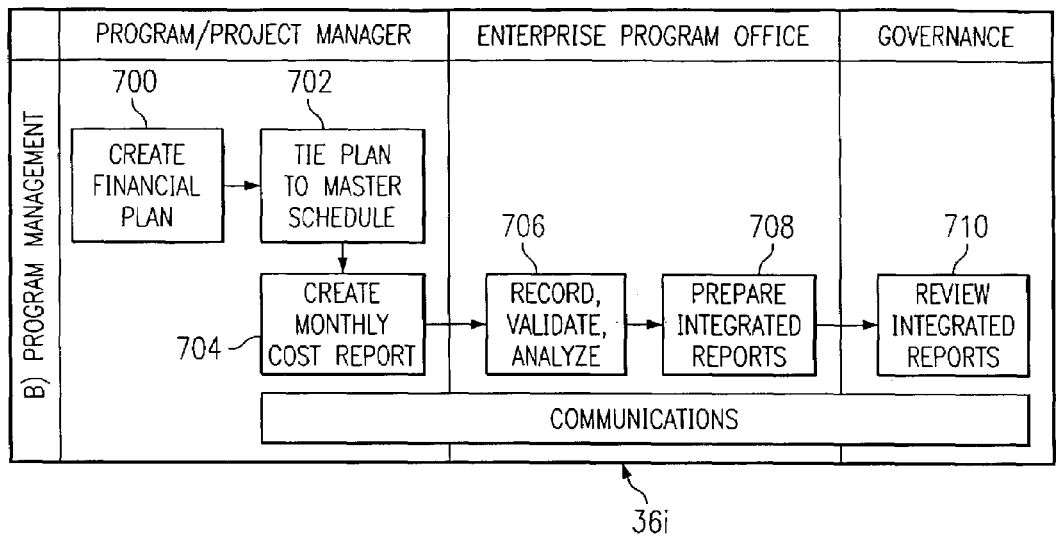
FIG. 13 illustrates an example enterprise financial management process.

FIG. 13 illustrates an example enterprise financial management process 36j. At step 700, a project or program manager 48 may create a project or program financial plan. Project or program manager 48 may document the financial plan using standards derived from project management level 12 and program management level 14. It may be necessary to synchronize the information in the financial plan with the baselines created in enterprise request management process 36*a*. It may also be desirable to update the financial plan with any approved changes to a project 18 or program 20 generated through enterprise scope management process 36*b*. At step 702, project or program manager 48 may integrate the financial plan with the master schedule (generated by enterprise performance monitoring process 36*h*). In one embodiment, project or program manager 48 ties the project or program financial plan to the project or program master schedule on a monthly basis. This may allow the monthly budget breakdown to be tied to the scheduled work for the month. At step 704, project or program manager 48 may capture the actual project or program costs incurred during a month. Project or program manager 48 may also prepare a monthly cost report and submit it to EPO 22.

At step 706, EPO 22 may record, validate, and analyze all the monthly cost reports within the enterprise. For each monthly cost report, EPO 22 may notify project or program manager 48 of receipt of the monthly cost report, log the monthly cost report, validate and review the monthly cost report, generate variance analysis and summary or otherwise integrated totals, do further research (for example, impact analysis) if necessary, integrate the information with other project or program cost reports, or perform any other suitable functions. At step 708, EPO 22 may update an EPO financial management log, along with any recommendations developed from its review and analysis. The EPO financial management log may also be submitted to governance structure 38 for review. In one embodiment, the EPO financial management log is submitted to governance structure 38 monthly. At step 710, governance structure 38 may review the EPO financial management log and take action, if necessary.

Figure 14:
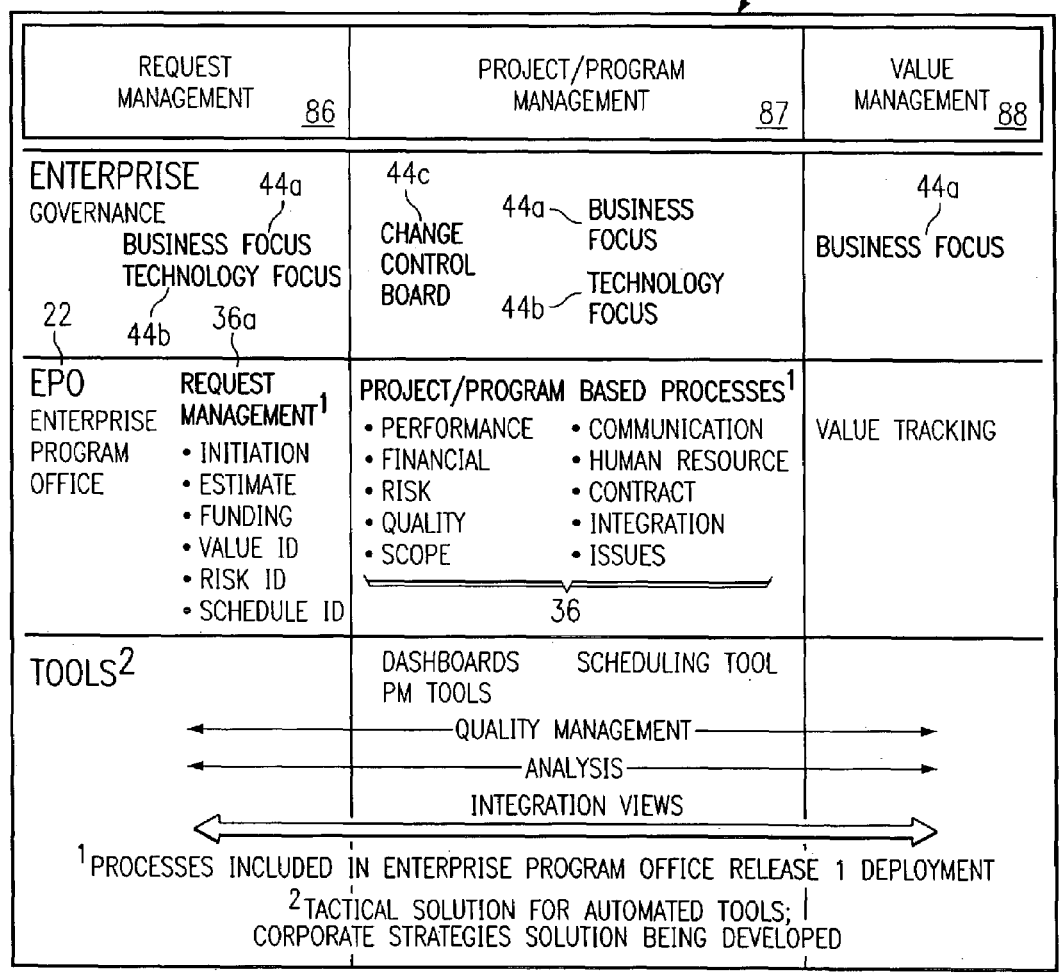
FIG. 14 illustrates an example life cycle for a project or program as it relates to EPO processes and governance.

FIG. 14 illustrates an example life cycle 85 for a project 18 or program 20 from a request management phase 86, through a project or program management phase 87, to a value management phase 88. In one embodiment, request management phase 86 may include governance bodies 44*a* and 44*b*, as well as enterprise request management process 36*a*. Project or program management phase 87 may include governance bodies 44*a*, 44*b*, and 44*c*, as well as various EPO processes 36. Project or program management phase 87 may also include project- or program-reporting dashboards, scheduling tools, or any other suitable tools. Value management phase 88 may include governance body 44*a* and benefits/value tracking. Request management phase 86, project or program management phase 87, and value management phase 88 may each include business value analysis.

Figure 15:
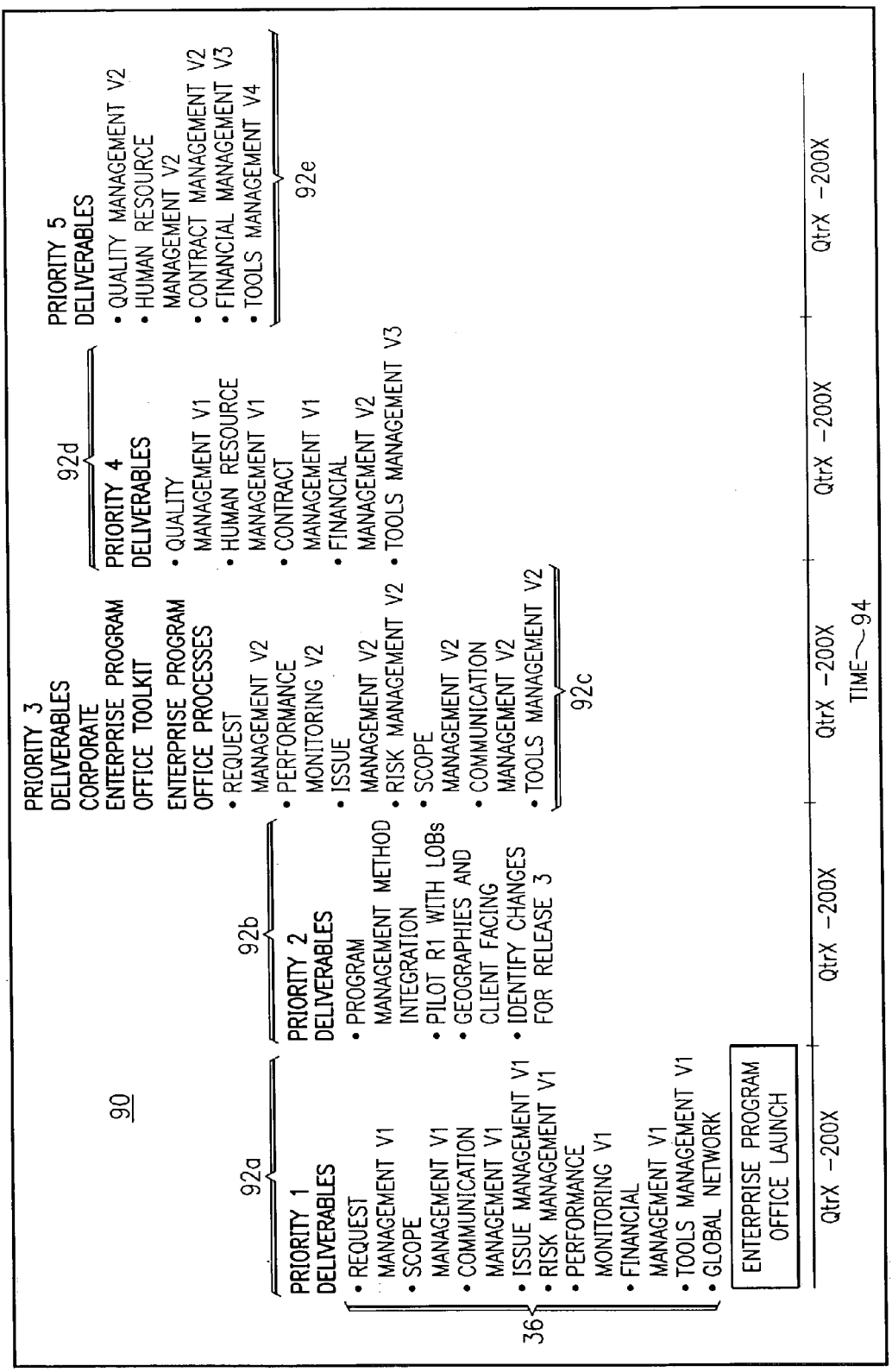
FIG. 15 illustrates an example rollout schedule of EPO processes.

FIG. 15 illustrates an example rollout schedule 86 of EPO processes 36, incorporating a number of releases 88 of particular EPO processes 36 over a predetermined time period 90. For example, certain EPO processes 36 may be utilized in the first quarter of a fiscal year, while different or additional EPO process 36 are utilized in the second quarter. Each subsequent release 88 of EPO processes 36 may incorporate continuous improvement feedback obtained from the user community. For example, in release 88*a*, enterprise request management process 36*a* is used. In release 88*b*, enterprise request management process 36*a* may be updated with continuous improvement feedback and may upgrade to the next version. If no improvements are necessary, the new release 88*b* may contain the same version as the previous release 88*a*. In certain embodiments, a business value review process 36 may be leveraged into releases 88. Business value review process 36 may assess the business and technical aspects of projects 18 and programs 20 and may highlight areas of risk. Business quality management review process 36 may also ensure that problems or inadequacies are identified early in life cycles 85 of projects 18 and programs 20, that the scope of a project 18 or program 20 is well defined, and that any gaps and overlaps with other projects 18 or programs 20 are addressed.

Release 88*a* includes example EPO processes 36, which may be included in an initial release. EPO processes 36 illustrated in release 88*a* (and all releases 88 in rollout schedule 86) are examples only. Any suitable number and types of EPO processes 36 may be included according to particular needs. These needs may be determined by examining the size, maturity, resources, or other suitable characteristics of the enterprise.

Figure 16:
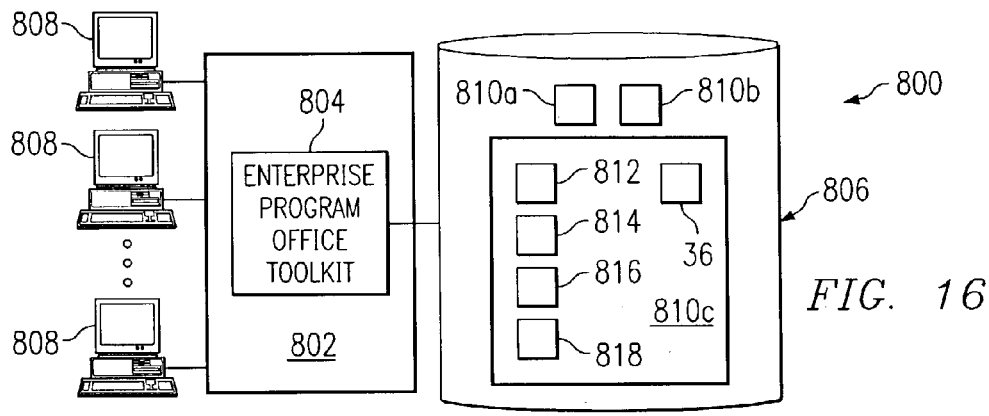
FIG. 16 illustrates an example system enabling establishment of an enterprise-specific EPO and an associated enterprise-specific EPO web site using an EPO toolkit.

FIG. 16 illustrates an example system 800 enabling establishment of an enterprise-specific EPO 22 and an associated enterprise-specific EPO web site 80 using an EPO toolkit. System 800 includes a server system 802, which supports an EPO toolkit 804 coupled to a database 806. EPO toolkit 804 provides certain features to assist each of one or more client systems 808 in the establishment of a corresponding enterprise-specific EPO 22 and associated enterprise-specific EPO web site 80. In general, EPO toolkit 802 receives a request from a client system 808, retrieves appropriate information from database 806, presents the information to client system 808, receives selections and other input from client system 808, and compiles and packages components of an enterprise-specific EPO web site 80 for an enterprise-specific EPO 22. EPO web site 80 may be downloaded for installation at client system 808 or, alternatively, installed at server system 802 for access using client system 808.

In one embodiment, server system 802 is coupled to multiple distributed client systems 808. Client systems 808 may be physically distributed, being in different physical locations geographically remote from each other and from server system 802, or logically distributed, being at approximately the same location as other client systems 808 and server system 802. Each client system 808 may be coupled to server system 802 using one or more computer buses, local area networks (LANs), metropolitan area networks (MANs), wide area networks (WANs), a global computer network such as the Internet, or any other wireline, optical, wireless, or other links.

Each client system 808 may operate using a different client platform, or two or more clients systems 808 may operate using identical client platforms. For example, suitable client platforms for EPO management might include, without limitation, WINDOWS NT, WINDOWS 2000, WINDOWS 98, WINDOWS ME, WINDOWS XP, UNIX, and DOS. Server system 802, database 806, and client systems 808 may each include an appropriate combination of hardware and software associated with one or more computer systems at one or more locations. These components of system 800 may share data storage, communications, or other resources according to particular needs. Each computer system may include one or more suitable input devices, output devices, mass storage media, processors, memory, or other components for receiving, processing, storing, and communicating information according to the operation of system 800.

Client system 808 submits a request to establish EPO web sites 80 using EPO toolkit 804 of server system 802. In one embodiment, client system 808 accesses EPO toolkit 804 using an associated web browser. EPO toolkit 804 provides certain tools 810 that assist a user associated with client system 808 to establish an EPO web site 80 for the associated enterprise. Tools 810 may be stored on database 806, accessible to EPO toolkit 804. As part of establishing an EPO website 80, EPO toolkit 804 may allow the user to register with server system 802 using a registration form 810*a*. For example, using registration form 810*a*, EPO toolkit 804 may request the name of the user, the user's telephone number, the user's e-mail address, the name of the enterprise, the line of business of the enterprise, the country in which the enterprise operates, and any other suitable information according to particular needs. EPO toolkit 804 may present the user with an option to review introductory materials 810*b* regarding establishing and operating an EPO 22 and an EPO web site 80. Introductory materials 810*b* may include an overview and background regarding EPOs 22 and an EPO web sites 80, their purpose, their value, a listing of their components, and any other suitable information according to particular needs.

EPO toolkit 804 may present the user with deployment support materials 810*c*, providing certain instructions and recommendations for establishing an EPO 22 and an associated EPO web site 80 for the enterprise. In one embodiment, before the user may access deployment support materials 810*c*, the user must register with server system 802, using registration form 810*a* for example, as described above. In one embodiment, EPO toolkit 804 uses deployment support materials 810*c* to recommend approximately eighty percent of the specifics the user needs to set up EPO 22, while the user provides the remaining approximately twenty percent. Deployment support materials 810*c* may include a deployment schedule 812 suggesting how to implement EPO processes 36 or other components of EPO 22. In one embodiment, EPO toolkit 804 recommends a generic deployment schedule 812 to all users requesting set-up of an EPO 22 and associated EPO web site 80. Users may be able to customize deployment schedule 812 according to particular needs, considering the size of the associated enterprises and their budgets for example.

Deployment support materials 810*c* may include EPO processes 36 along with forms and templates 814 for establishing and executing EPO processes 36. Deployment support materials 810*c* may include example documentation and educational materials 816 regarding EPO processes 36 and the various committees recommended for proper implementation in certain embodiments of EPO 22, such as governance board 38. In one embodiment, EPO toolkit 804 recommends generic information regarding deployment support materials 810*c* to all users requesting set-up of an EPO 22 and associated EPO web site 80. Users may be able to customize deployment support materials 810*c* according to particular needs, considering the size of the associated enterprises and their budgets for example.

Deployment support materials 810*c* may include a web site shell 818 for implementing an enterprise-specific EPO web site 80. A user may be able to download web site shell 818 to associated client system 808 to establish an EPO web site 80 for the corresponding enterprise. In one embodiment, web site shell 818 is a zip package containing a directory structure and all files (HTML pages, assets, and images for example) associated with an initial build of EPO web site 80. Web site shell 818 may be downloaded and installed on a platform associated with client system 808. Alternatively, EPO web site 80 may be installed on server system 802 and made accessible to client system 808 in a secure manner.

Web site shell 818 may be generic such that any user begins with the same web site shell 818. Before or after components of web site shell 818 are installed, before components of web site shell 818 are downloaded for example, the user may be able to customize some or all of these components according to particular needs. As an example, a user may download web site shell 818 to the user's associated client system 808. The user may then customize the downloaded web site shell 818 or particular components of web site shell 818 for installation on a platform associated with client system 808. A user may customize EPO web site 80 according to the nature, size, or budget of the associated enterprise for example. As another example, a user may use a client system 808 to customize web site shell 818 at server system 802. Server system 802 may compile and package selected components of EPO web site shell 818, such as the customized components, to create EPO web site 80 and may communicate those components to client system 808 for installation of EPO web site 80 on client system 808. Alternatively, as described above, server system 802 may compile and package the selected components of web site shell 818 for installation of EPO web site 80 on server system 802, EPO web site 80 being made accessible to client system 808 in a secure manner. In certain embodiments, the compiled and packaged components of EPO web site shell 818 may include generic components not customized by the user.

Figure 17:
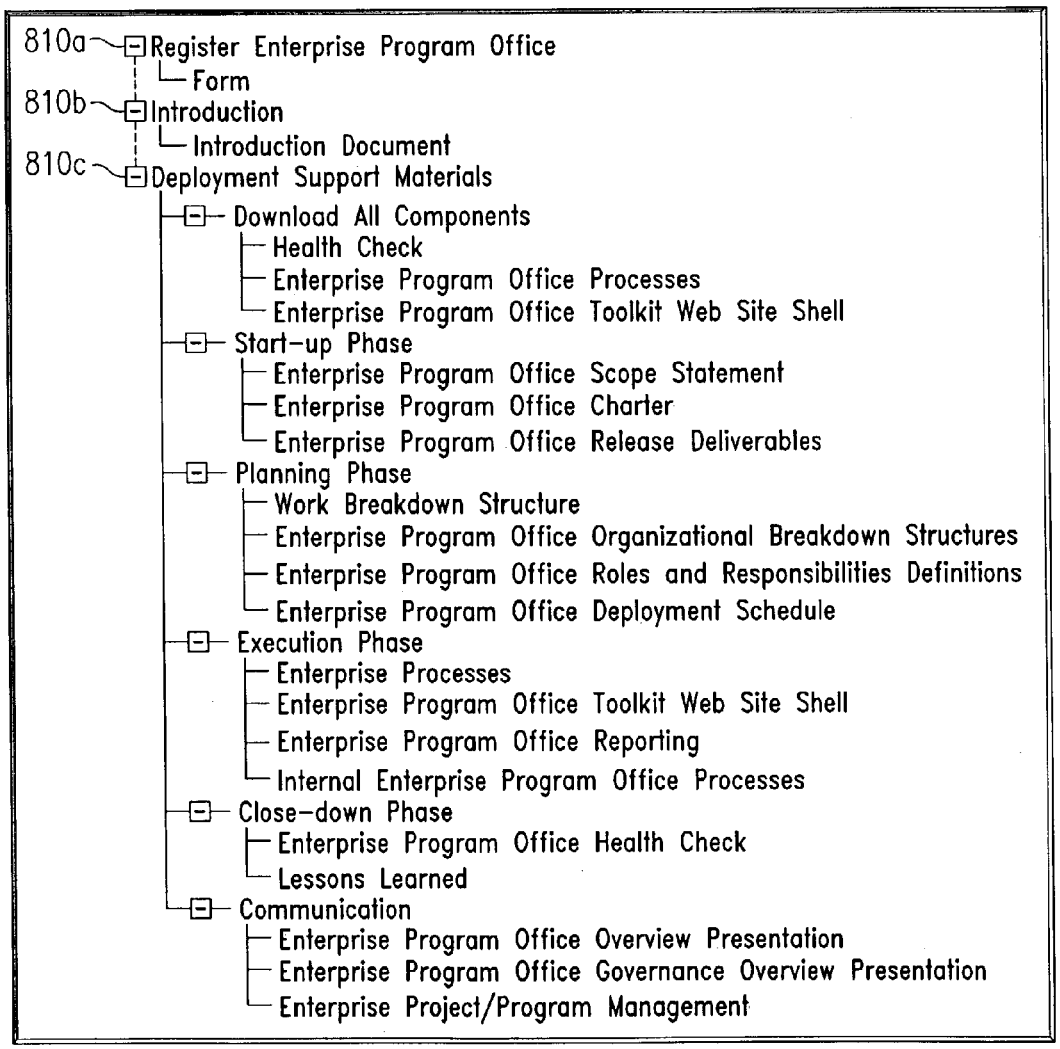
FIG. 17 illustrates an example logical arrangement of example EPO tools associated with an EPO toolkit.

FIG. 17 illustrates an example logical arrangement of example EPO tools 810 that client systems 808 may access using EPO toolkit 804 of server system 802. The content and arrangement of tools 810 illustrated in FIG. 17 merely represent a non-limiting example of tools 810 of EPO toolkit 804. Tools 810 illustrated may not be required and others not listed may be included and still fall within the spirit and scope of the present invention. As described above, deployment support materials 810*c*, for example, may represent recommendations and may be customizable by a user associated with a client system 808.

Figure 18:
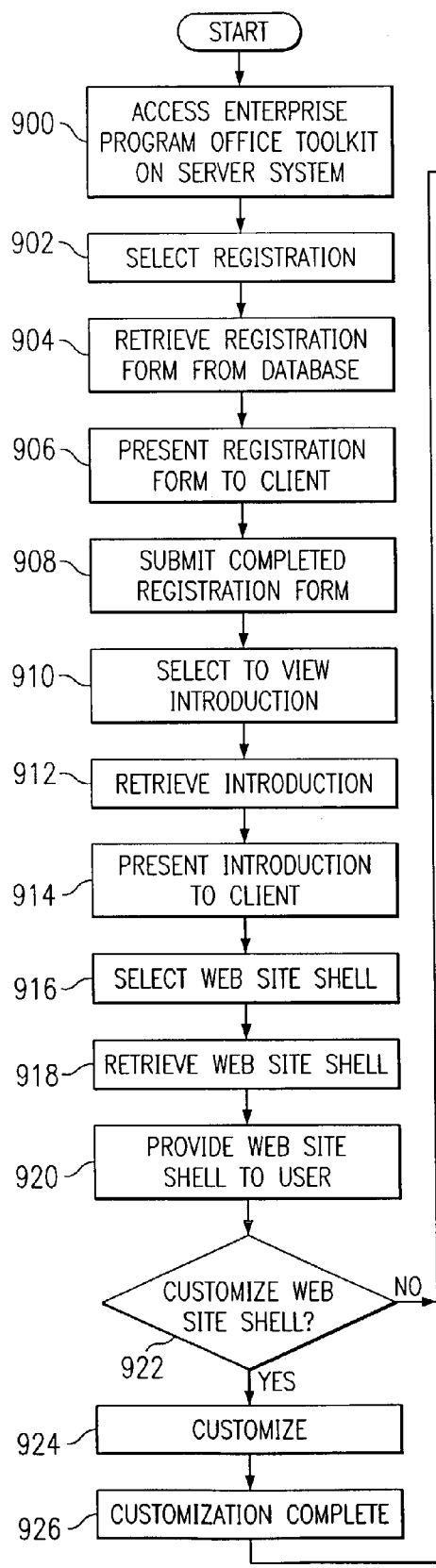
FIG. 18 illustrates an example method for establishing an enterprise-specific EPO and an associated enterprise-specific EPO web site using an EPO toolkit.
Figure 18:
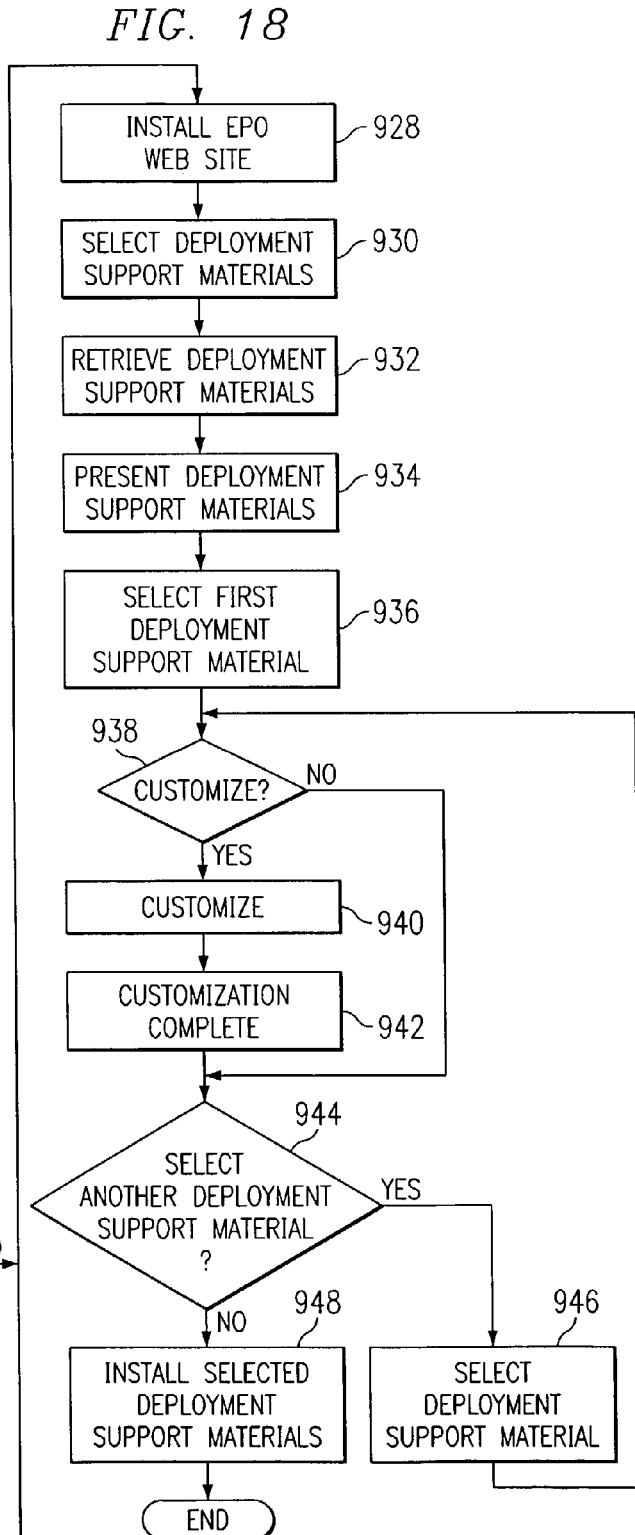

FIG. 18 illustrates an example method for establishing an enterprise-specific EPO 22 and associated enterprise-specific EPO web site 80 using EPO toolkit 804. At step 900, a user associated with a client system 808 accesses EPO toolkit 804 of server system 802. At step 902, the user selects to register with server system 802. EPO toolkit 804 accesses database 806 to retrieve registration form 810*a* at step 904 and presents registration form 810*a* to the user at step 906. At step 908, the user submits completed registration form 810*a* to server system 802. At step 910, the user selects to view introductory materials 810*b*. EPO toolkit 804 accesses database 806 to retrieve introductory materials 810*b* at step 912 and presents introduction 810*b* to the user at step 914.

At step 916, the user selects web site shell 818 and at step 918, EPO toolkit 804 retrieves web site shell 818. At step 920, EPO toolkit 804 provides web site shell 818 to the user. In one embodiment, server system 802 may communicate web site shell 818 to client system 808 associated with the user for customization. In another embodiment, web site shell 818 may be customized at server system 802. At step 922, the user determines whether to customize web site shell 818 to create an enterprise-specific EPO web site 80 with features particular to the corresponding enterprise. If the user desires to customize web site shell 818, the user does so at step 924. When the user has completed customization of web site shell 818 or if the user does not desire to customize web site shell 818, web site shell 818 is complete at step 926. At step 928, EPO web site 80 is installed. As described above, in one embodiment, after customization at client system 808, EPO web site 80 may be installed at client system 808. In another embodiment, after customization at server system 802, server system 802 may compile and package web site shell 818 and communicate web site shell 818 to client system 808 for installation of EPO web site 80. In another embodiment, after customization at server system 802, server system 802 may compile and package web site shell 818 for installation of EPO web site 80 on server system 802. In certain embodiments, the compiled and packaged components of EPO web site shell 818 may include generic components not customized by the user.

At step 930, the user selects deployment support materials 810c and, at step 932, EPO toolkit 804 retrieves deployment support materials 810c. At step 934, EPO toolkit 804 presents deployment support materials 810c to the user. In one embodiment, server system 802 may communicate deployment support materials 810c to client system 808 associated with the user for customization. In another embodiment, deployment support materials 810c may be customized at server system 802. At step 936, the user selects a first deployment support material 810c. For example, the user may select documentation and educational materials 816 regarding EPO processes 36. As another example, the user may select a particular EPO process 36. At step 938, the user determines whether to customize the first deployment support material 810c selected at step 936. If the user desires to customize the first deployment material 810c, the user does so at step 940.

When the user has completed customization of the first deployment support material 810c or if the user does not desire to customize first deployment support material 810c, the first deployment support material 810c is complete at step 942 and the user determines whether to select another deployment support material 810c at step 944. If the user desires to select another deployment support material 810c, the user does so at step 946 and the method returns to step 938 to make a determination regarding customization of this deployment support material 810c. Otherwise, if the user does not desire to select another deployment support material 810c, information needed to establish the enterprise-specific EPO web site 80 is complete at step 942. At step 948, deployment support materials 810c are installed. As described above, in one embodiment, after customization at client system 808, deployment support materials 810c may be installed at client system 808. In another embodiment, after customization at server system 802, server system 802 may compile and package selected deployment support materials 810c and communicate selected deployment support materials 810c to client system 808 for installation. In another embodiment, after customization at server system 802, server system 802 may compile and package selected deployment support materials 810c for installation on server system 802. Steps 928 and 948 may be performed at the same or different times according to particular needs. In practice, the steps of the method may be performed in any suitable order and may overlap in whole or in part.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for establishing an enterprise-specific enterprise program office (EPO) and an associated enterprise-specific EPO web site, comprising:
    a server system operable to communicate with a plurality of client systems, each client system being associated with a corresponding enterprise;
    a database associated with the server system and containing an EPO toolkit accessible to the client systems using the server system, the EPO toolkit comprising:
        a customizable EPO web site shell, the customizable EPO web site shell providing a generic EPO web site structure on which an enterprise associated with a client system may base an enterprise-specific EPO web site for an enterprise-specific EPO, the customizable EPO web site shell operable to be customized by a user of a client system to create an enterprise-specific EPO web site shell with features particular to the corresponding enterprise; and
        a plurality of customizable deployment support materials providing instructions and recommendations for establishing the enterprise-specific EPO and associated enterprise-specific EPO web site; and
    the server system operable to:
        receive from a user associated with a client system a request for the customizable EPO web site shell;
        retrieve the customizable EPO web site shell from the database;
        provide the customizable EPO web site shell to the user for customization, if desired, to create an enterprise-specific EPO web site shell with features particular to the corresponding enterprise; and
        provide at least a portion of the deployment support materials to the user, the deployment support materials recommending specifics for setting up the enterprise-specific EPO and facilitating establishment of the enterprise-specific EPO through one or more deployment phases and according to a deployment schedule.

2. The system of claim 1, wherein the server system is operable to:
    allow the user to customize the customizable EPO web site shell at the server system;
    compile and package components of an enterprise-specific EPO web site comprising user-specified customizations; and
    communicate the compiled and packaged components of the enterprise-specific EPO web site to the client system for installation.

3. The system of claim 2, wherein the compiled and packaged components further comprise one or more generic components not customized by the user.

4. The system of claim 1, wherein the server system is operable to communicate compiled and packaged components of the enterprise-specific EPO web site to the client system for customization at the client system prior to installation.

5. The system of claim 1, wherein:
    the deployment support materials comprise:
        a plurality of EPO processes to be used in implementing an enterprise specific EPO;
        a deployment schedule suggesting one or more milestones for implementing the EPO processes, the milestones specifying completion dates for implementation of the EPO processes;
        one or more forms or templates for establishing and executing the EPO processes; and
        educational materials regarding the EPO and the EPO processes; and
    for each of one or more selected customizable deployment support materials, the server system operable to:
        receive from the user a request for the customizable deployment support material;
        retrieve the customizable deployment support material from the database; and
        provide the customizable deployment support material to the user for customization, if desired.

6. The system of claim 5, wherein the server system is operable to:
    allow the user to customize the selected customizable deployment support materials at the server system;

compile and package the selected deployment support materials comprising user-specified customizations; and communicate the compiled and packaged selected deployment support materials to the client system for installation.

7. The system of claim 6, wherein the compiled and packaged deployment support materials further comprise generic deployment support materials not customized by the user.

8. The system of claim 5, wherein the EPO processes comprise one or more of an enterprise request management process, an enterprise scope management process, an enterprise communication management process, an enterprise value management process, an enterprise human resource management process, an enterprise issue management process, an enterprise risk management process, an enterprise performance monitoring process, an enterprise quality management process, an enterprise financial management process, and an enterprise procurement management process.

9. The system of claim 1, wherein the EPO toolkit further comprises a registration form for registering an enterprise with the server system, the user being required to complete the registration form before the customizable EPO web site shell is provided to the user.

10. The system of claim 1, wherein the EPO toolkit further comprises introductory materials comprising overview and background information regarding EPOs and EPO web sites generally.

11. A method for establishing an enterprise-specific enterprise program office (EPO) and an associated enterprise-specific EPO web site, comprising:

providing a plurality of client systems each associated with a corresponding enterprise with access to a database associated with a server system and containing an EPO toolkit accessible to the client systems using the server system, the EPO toolkit comprising:

a customizable EPO web site shell providing a generic EPO web site structure on which an enterprise associated with a client system may base an enterprise-specific EPO web site for an enterprise-specific EPO, the customizable EPO web site shell operable to be customized by a user of a client system to create an enterprise-specific EPO web site shell with features particular to the corresponding enterprise; and a plurality of customizable deployment support materials for establishing the enterprise-specific EPO and associated enterprise-specific EPO web site;

receiving from a user associated with a client system a request for the customizable EPO web site shell;

retrieving the customizable EPO web site shell from the database;

providing the customizable EPO web site shell to the user for customization, if desired, to create an enterprise-specific EPO web site shell with features particular to the corresponding enterprise; and providing at least a portion of the deployment support materials to the user, the deployment support materials recommending specifics for setting up the enterprise-specific EPO and facilitating establishment of the enterprise-specific EPO through one or more deployment phases and according to a deployment schedule.

12. The method of claim 11, further comprising:
allowing the user to customize the customizable EPO web site shell at the server system;
compiling and packaging components of an enterprise-specific EPO web site comprising user-specified customizations; and
communicating the compiled and packaged components of the enterprise-specific EPO web site to the client system for installation.

13. The method of claim 12, wherein the compiled and packaged components further comprise one or more generic components not customized by the user.

14. The method of claim 11, further comprising communicating compiled and packaged components of the enterprise-specific EPO web site to the client system for customization at the client system prior to installation.

15. The method of claim 11, wherein:
the deployment support materials comprise:
a plurality of EPO processes to be used in implementing an enterprise specific EPO;
a deployment schedule suggesting one or more milestones for implementing the EPO processes, the milestones specifying completion dates for implementation of the EPO processes;
one or more forms or templates for establishing and executing the EPO processes; and
educational materials regarding the EPO and the EPO processes; and
for each of one or more selected customizable deployment support materials:
receiving from the user a request for the customizable deployment support material;
retrieving the customizable deployment support material from the database; and
providing the customizable deployment support material to the user for customization, if desired.

16. The method of claim 15, further comprising:
allowing the user to customize the selected customizable deployment support materials at the server system;
compiling and packaging the selected deployment support materials comprising user-specified customizations; and
communicating the compiled and packaged selected deployment support materials to the client system for installation.

17. The method of claim 16, wherein the compiled and packaged deployment support materials further comprise generic deployment support materials not customized by the user.

18. The method of claim 15, wherein the EPO processes comprise one or more of an enterprise request management process, an enterprise scope management process, an enterprise communication management process, an enterprise value management process, an enterprise human resource management process, an enterprise issue management process, an enterprise risk management process, an enterprise performance monitoring process, an enterprise quality management process, an enterprise financial management process, and an enterprise procurement management process.

19. The method of claim 11, wherein the EPO toolkit further comprises a registration form for registering an enterprise with the server system, the user being required to complete the registration form before the customizable EPO web site shell is provided to the user.

20. The method of claim 11, wherein the EPO toolkit further comprises introductory materials comprising overview and background information regarding EPOs and EPO web sites generally.

21. A computer readable media comprising software for establishing an enterprise-specific enterprise program office (EPO) and an associated enterprise-specific EPO web site, the software and when executed operable to:

provide a server system operable to communicate with a plurality of client systems, each client system being associated with a corresponding enterprise;

provide a database associated with the server system and containing an EPO toolkit accessible to the client systems using the server system, the EPO toolkit comprising:

a customizable EPO web site shell, the customizable EPO web site shell providing a generic EPO web site structure on which an enterprise associated with a client system may base an enterprise-specific EPO web site for an enterprise-specific EPO, the customizable EPO web site shell operable to be customized by a user of a client system to create an enterprise-specific EPO web site shell with features particular to the corresponding enterprise; and a plurality of customizable deployment support materials for establishing the enterprise-specific EPO and associated enterprise-specific EPO web site;

the software operable to:

receive from a user associated with a client system a request for the customizable EPO web site shell;

retrieve the customizable EPO web site shell from the database;

provide the customizable EPO web site shell to the user for customization, if desired, to create an enterprise-specific EPO web site shell with features particular to the corresponding enterprise; and provide at least a portion of the deployment support materials to the user, the deployment support materials recommending specifics for setting up the enterprise-specific EPO and facilitating establishment of the enterprise-specific EPO through one or more deployment phases and according to a deployment schedule.

22. The software of claim 21, wherein the software is operable to:

allow the user to customize the customizable EPO web site shell at the server system;

compile and package components of an enterprise-specific EPO web site comprising user-specified customizations; and communicate the compiled and packaged components of the enterprise-specific EPO web site to the client system for installation.

23. The software of claim 22, wherein the compiled and packaged components further comprise one or more generic components not customized by the user.

24. The software of claim 21, wherein the server system is operable to communicate compiled and packaged components of the enterprise-specific EPO web site to the client system for customization at the client system prior to installation.

25. The software of claim 21, wherein:

the deployment support materials comprise:

a plurality of EPO processes to be used in implementing an enterprise specific EPO;

a deployment schedule suggesting one or more milestones for implementing the EPO processes, the milestones specifying completion dates for implementation of the EPO processes;

one or more forms or templates for establishing and executing the EPO processes; and educational materials regarding the EPO and the EPO processes; and for each of one or more selected customizable deployment support materials, the server system operable to:

receive from the user a request for the customizable deployment support material;

retrieve the customizable deployment support material from the database; and provide the customizable deployment support material to the user for customization, if desired.

26. The software of claim 25, wherein the server system is operable to:

allow the user to customize the selected customizable deployment support materials at the server system;

compile and package the selected deployment support materials comprising user-specified customizations; and communicate the compiled and packaged selected deployment support materials to the client system for installation.

27. The software of claim 26, wherein the compiled and packaged deployment support materials further comprise generic deployment support materials not customized by the user.

28. The software of claim 25, wherein the EPO processes comprise one or more of an enterprise request management process, an enterprise scope management process, an enterprise communication management process, an enterprise value management process, an enterprise human resource management process, an enterprise issue management process, an enterprise risk management process, an enterprise performance monitoring process, an enterprise quality management process, an enterprise financial management process, and an enterprise procurement management process.

29. The software of claim 21, wherein the EPO toolkit further comprises a registration form for registering an enterprise with the server system, the user being required to complete the registration form before the customizable EPO web site shell is provided to the user.

30. The software of claim 21, wherein the EPO toolkit further comprises introductory materials comprising overview and background information regarding EPOs and EPO web sites generally.

31. A system for establishing an enterprise-specific enterprise program office (EPO) and an associated enterprise-specific EPO web site, comprising:

means for providing a plurality of client systems each associated with a corresponding enterprise with access to a database associated with the server system and containing an EPO toolkit accessible to the client systems using the server system, the EPO toolkit comprising:

a customizable EPO web site shell, the customizable EPO web site shell providing a generic EPO web site structure on which an enterprise associated with a client system may base an enterprise-specific EPO web site for an enterprise-specific EPO, the customizable EPO web site shell operable to be customized by a user of a client system to create an enterprise-specific EPO web site shell with features particular to the corresponding enterprise; and a plurality of customizable deployment support materials for establishing the enterprise-specific EPO and associated enterprise-specific EPO web site;

means for receiving from a user associated with a client system a request for the customizable EPO web site shell;

means for retrieving the customizable EPO web site shell from the database;

means for providing the customizable EPO web site shell to the user for customization, if desired, to create an enterprise-specific EPO web site shell with features particular to the corresponding enterprise; and means for providing at least a portion of the deployment support materials to the user, the deployment support materials recommending specifics for setting up the enterprise-specific EPO and facilitating establishment of the enterprise-specific EPO through one or more deployment phases and according to a deployment schedule.

32. A system for establishing an enterprise-specific enterprise program office (EPO) and an associated enterprise-specific EPO web site, comprising:

a server system operable to communicate with a plurality of client systems, each client system being associated with a corresponding enterprise;

a database associated with the server system and containing an EPO toolkit accessible to the client systems using the server system, the EPO toolkit comprising a plurality of customizable deployment support materials for establishing an enterprise-specific EPO and an associated enterprise-specific EPO web site, the deployment support materials comprising:

a plurality of EPO processes to be used in implementing an enterprise specific EPO;

a schedule suggesting one or more milestones for implementing the EPO processes, the milestones specifying completion dates for implementation of the EPO processes;

one or more forms or templates for establishing and executing the EPO processes;

educational materials regarding the EPO and the EPO processes; and a customizable EPO web site shell, the customizable EPO web site shell providing a generic EPO web site structure on which an enterprise associated with a client system may base an enterprise-specific EPO web site for an enterprise-specific EPO, the customizable EPO web site shell operable to be customized by a user of a client system to create an enterprise-specific EPO web site shell with features particular to the corresponding enterprise; and for each of one or more selected customizable deployment support materials, the server system operable to:

receive from a user associated with a client system a request to download the customizable deployment support material; and retrieve the customizable deployment support material from the database and provide the customizable deployment support material to the user;

communicate compiled and packaged components of the enterprise-specific EPO web site to the client system for customization, if desired, at the client system prior to installation;

the server system operable to provide at least a portion of the deployment support materials to the user, the deployment support materials recommending specifics for setting up the enterprise-specific EPO and facilitating establishment of the enterprise-specific EPO through one or more deployment phases and according to the schedule.

* * * * *